United States Patent
Tsuda

(10) Patent No.: US 11,142,202 B2
(45) Date of Patent: Oct. 12, 2021

(54) CONTROL SYSTEM FOR HYBRID VEHICLE

(71) Applicant: TOYOTA JIDOSHA KABUSHIKI KAISHA, Toyota (JP)

(72) Inventor: Satoshi Tsuda, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 16/431,096

(22) Filed: Jun. 4, 2019

(65) Prior Publication Data

US 2020/0047761 A1 Feb. 13, 2020

(30) Foreign Application Priority Data

Aug. 8, 2018 (JP) .............................. JP2018-149333

(51) Int. Cl.
*B60W 30/18* (2012.01)
*B60W 30/188* (2012.01)
*B60W 20/14* (2016.01)

(52) U.S. Cl.
CPC ...... *B60W 30/18127* (2013.01); *B60W 20/14* (2016.01); *B60W 30/188* (2013.01)

(58) Field of Classification Search
CPC ......... B60W 30/18127; B60W 30/188; B60W 20/14; B60W 10/08; B60W 10/06; B60W 20/00; B60W 2510/244; B60W 2710/083; B60W 20/40; B60W 2510/0638; B60W 2510/081; B60W 2540/12; B60W 10/26; B60W 20/10; B60W 20/251; B60W 20/00657; B60W 10/11; B60W 2520/04; B60W 2710/0644; B60W 2710/105; B60W 30/18108; B60W 10/15; B60L 7/10; B60L 15/20; B60L 2240/423; B60L 2240/421; B60L 15/2009; B60L 11/14; B60L 11/1861; B60L 2240/441; B60K 6/445

See application file for complete search history.

(56) References Cited

U.S. PATENT DOCUMENTS

| | | | |
|---|---|---|---|
| 8,731,760 B2 * | 5/2014 | Nishinakamura | B60K 6/442 701/22 |
| 9,796,375 B2 * | 10/2017 | Oshiumi | B60W 10/08 |
| 2013/0073136 A1 * | 3/2013 | Yamamoto | B60W 20/10 701/22 |
| 2015/0014072 A1 * | 1/2015 | Maruyama | B60W 30/18072 180/65.23 |
| 2017/0363204 A1 | 12/2017 | Matsubara et al. | |
| 2019/0322269 A1 * | 10/2019 | Sasaki | B60W 10/08 |
| 2019/0351892 A1 * | 11/2019 | Tsuda | B60W 20/11 |

FOREIGN PATENT DOCUMENTS

| | | |
|---|---|---|
| JP | 2008-254650 A | 10/2008 |
| JP | 2017-223309 A | 12/2017 |

* cited by examiner

*Primary Examiner* — Pamela Rodriguez
(74) *Attorney, Agent, or Firm* — Oliff PLC

(57) ABSTRACT

A control system for a hybrid vehicle configured to reduce an exhaust gas during deceleration of the vehicle, and to protect a motor and a battery. A control mode of the engine may be selected from: a low-power mode in which the hybrid vehicle is decelerated by reducing a torque and a power of the engine at a predetermined rate while generating the brake torque by the motor; and a high-power mode in which the hybrid vehicle is decelerated by reducing the torque and the power of the engine at a rate slower than the predetermined rate of the low-power mode while generating the brake torque by the motor.

9 Claims, 14 Drawing Sheets

CONTROL SYSTEM FOR HYBRID VEHICLE

CROSS REFERENCE TO RELATED APPLICATIONS

The present application claims the benefit of priority to Japanese Patent Application No. 2018-149333 filed on Aug. 8, 2018 with the Japanese Patent Office.

BACKGROUND

Field of the Disclosure

Embodiments of the present disclosure relate to the art of a control system for a hybrid vehicle in which a prime mover includes an engine and a motor-generator, and especially to a control system configured to control the engine during deceleration of the hybrid vehicle.

Discussion of the Related Art

JP-A-2017-223309 describes a control apparatus for a vehicle configured to prevent an abrupt raise in an engine speed during deceleration of the vehicle, and to reduce a shock that occurs due to loss of backlash in a power transmission path of the vehicle. Specifically, the control apparatus taught by JP-A-2017-223309 is applied to a vehicle comprising a lock-up clutch. According to the teachings of JP-A-2017-223309, the control apparatus selects a control mode of the lock-up clutch from: a complete engagement mode in which the lock-up clutch is engaged completely; an acceleration slip mode in which a differential rotation of the lock-up clutch is allowed during acceleration of the vehicle; and a deceleration slip mode in which a differential rotation of the lock-up clutch is allowed during deceleration of the vehicle.

For example, in a case where a change in an engine torque resulting from returning an accelerator pedal is greater than a predetermined value, the control apparatus taught by JP-A-2017-223309 determines that the engine torque will be raised abruptly to generate a shock. In this case, the control mode of the lock-up clutch will not be shifted immediately from the complete engagement mode to the deceleration slip mode. In this case, specifically, the control mode of the lock-up clutch will be shifted from the complete engagement mode to the acceleration slip mode, and further shifted to the deceleration slip mode after the vehicle is brought into a driven state.

Thus, according to the teachings of JP-A-2017-223309, an abrupt raise in the engine speed and generation of a shock during deceleration may be prevented by controlling the lock-up clutch. In addition, although JP-A-2017-223309 does not describes a technique to directly control a change in the engine torque, it is also possible to control an engine speed and the engine torque by the control apparatus taught by JP-A-2017-223309 to prevent an abrupt change in the torque and a generation of the shock.

However, when the accelerator pedal is returned completely so that a throttle valve is closed completely to reduce the engine torque to zero, an air intake will be reduced abruptly thereby increasing an exhaust gas. In addition, given that such control is applied to a hybrid vehicle having an engine and a motor-generator, the motor-generator and a battery may not be protected properly depending on a condition of the engine. For example, an overheating of the motor-generator and an overcharging of the battery would be caused.

SUMMARY

Aspects of the present disclosure have been conceived noting the foregoing technical problems, and it is therefore an object of the present disclosure to provide a control system for a hybrid vehicle configured to reduce an exhaust gas during deceleration of the vehicle, and to protect a motor and a battery.

The control system according to the embodiment of the present disclosure is applied to a hybrid vehicle comprising: an engine; a first motor that controls a speed of the engine; a second motor that applies a brake torque to drive wheels when regenerating energy; and an electric storage device that is electrically connected to the first motor and the second motor. The control system is configured to decelerate the hybrid vehicle by controlling the second motor to generate the brake torque while controlling the first motor to reduce a speed of the hybrid vehicle. The control system is provided with a controller that controls the engine. In order to achieve the above-explained objective, according to the exemplary embodiment of the present disclosure, the controller is configured to select a control mode of the engine from: a low-power mode in which the hybrid vehicle is decelerated in response to a decelerating operation by reducing a torque and a power of the engine at a predetermined rate while generating the brake torque by the second motor; and a high-power mode in which the hybrid vehicle is decelerated in response to a decelerating operation by reducing the torque and the power of the engine at a rate slower than the predetermined rate of the low-power mode while generating the brake torque by the second motor.

In a non-limiting embodiment, the high-power mode may include: a first control mode in which the hybrid vehicle is decelerated while reducing the torque and the speed of the engine such that an operating point of the engine is shifted along an optimum fuel economy curve; and a second control mode in which the hybrid vehicle is decelerated while reducing the torque of the engine at a same rate as in the first control mode, reducing the speed of the engine at a faster rate than in the first control mode, and reducing the power of the engine at a slower rate than in the low-power mode, so as to reduce emission.

In a non-limiting embodiment, the controller may be further configured to select the control mode of the engine based on a state of charge level of the electric storage device or an acceptable value of an input power to the electric storage device when decelerating the vehicle.

In a non-limiting embodiment, the controller may be further configured to: select the first control mode when the state of charge level of the electric storage device is lower than a first threshold level; select the second control mode when the state of charge level of the electric storage device is higher than the first threshold level but lower than a second threshold level; and select the low-power mode when the state of charge level of the electric storage device is higher than the second threshold level.

In a non-limiting embodiment, the controller may be further configured to: select the first control mode when the acceptable value of the input power to the electric storage device is greater than a first acceptable value; select the second control mode when the acceptable value of the input power to the electric storage device is smaller than the first acceptable value but greater than a second acceptable value; and select the low-power mode when the acceptable value of the input power to the electric storage device is smaller than the second acceptable value.

In a non-limiting embodiment, the controller may be further configured to: determine whether the input power to the electric storage device given that the engine is controlled in the first control mode is smaller than a current acceptable value of the input power to the electric storage device; determine whether the input power to the electric storage device given that the engine is controlled in the second control mode is smaller than a current acceptable value of the input power to the electric storage device; select the first control mode when the input power to the electric storage device given that the engine is controlled in the first control mode is smaller than the current acceptable value of the input power to the electric storage device; select the second control mode when the input power to the electric storage device given that the engine is controlled in the first control mode is greater than the current acceptable value of the input power to the electric storage device, but smaller than the input power to the electric storage device given that the engine is controlled in the second control mode; and select the low-power mode when the input power to the electric storage device given that the engine is controlled in the second control mode is greater than the current acceptable value of the input power to the electric storage device.

In a non-limiting embodiment, the controller may be further configured to determine whether the vehicle can be decelerated in the high-power mode in response to the decelerating operation using an equation of motion in which the torque of the second motor and the torque of the engine are employed as parameters.

In a non-limiting embodiment, the controller may be further configured to: select the control mode of the engine based on a required deceleration including a shift range, an operating amount of a brake pedal, an operating speed of a predetermined pedal in a one-pedal mode, and a road grade with respect to a flat road; select the first control mode or the second control mode when a predetermined condition of the required deceleration is satisfied; and select the low-power mode when the predetermined condition of the required deceleration is not satisfied.

In a non-limiting embodiment, the hybrid vehicle may further comprise a power split mechanism that distributes an output power of the engine to an output member and to the first motor. The power split mechanism may include a planetary gear unit having an input element connected to the engine, a reaction element connected to the first motor, and an output element connected to the output member. The second motor may be connected to a power transmission path between the drive wheels and the output member.

Thus, according to the exemplary embodiment of the present disclosure, the hybrid vehicle is decelerated by controlling the speed of the engine by the first motor, and by applying the brake torque generated by the second motor to the drive wheels. When decelerating the hybrid vehicle in the high-power mode, the torque and the power of the engine are reduced at the rate slower than the predetermined rate of the low-power mode. In this situation, therefore, the air intake to the engine is reduced slower than in the low-power mode in which the speed and the torque of the engine are reduced promptly. For this reason, the air intake can be estimated accurately to control an air/fuel ratio to reduce emission of the polluting gas.

As described, the high-power mode may be selected from the first control mode and the second control mode. In the first control mode, specifically, the engine is controlled in such a manner that an operating point of the engine is shifted along an optimum fuel economy curve. On the other hand, in the second control mode, the torque of the engine is reduced at a substantially same rate as in the first control mode, the speed of the engine is reduced at a faster rate than in the first control mode, and the power of the engine is reduced at a slower rate than in the low-power mode. In the second control mode, therefore, the output power of the engine may be reduced while reducing a regeneration amount of the second motor compared to the first control mode. That is, for example, if the state of charge level of the electric storage device is high, the hybrid vehicle is allowed to be decelerated while reducing the emission and charging the electric storage device within an upper limit by selecting the second control mode. For this reason, an overcharging of the electric storage device can be prevented.

The control mode of the engine may be selected based on the fact that the second motor is in a condition possible to generate the brake torque for decelerating the vehicle while maintaining the output torque of the engine. For example, in order to decelerate the hybrid vehicle while reducing the output power of the engine slowly to reduce emission, the second motor is allowed to generate the brake torque greater than the output torque of the engine to decelerate the hybrid vehicle if a temperature of the second motor itself or a power control unit falls within a predetermined range. Therefore, the first control mode or the second control mode is selected when e.g., the temperature of the second motor is lower than the predetermined value. For this reason, the control mode of the engine can be selected properly to reduce emission of the polluting gas while protecting the electric storage device, the motors, and the power control unit.

In addition, the control mode of the engine may be selected based on the required deceleration taking account of the shift range, the operating amount of a brake pedal, the operating speed of a predetermined pedal in a one-pedal mode, or the road grade. For this reason, the required deceleration can be achieved while reducing emission of the polluting gas and protecting the electric storage device and the motors.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
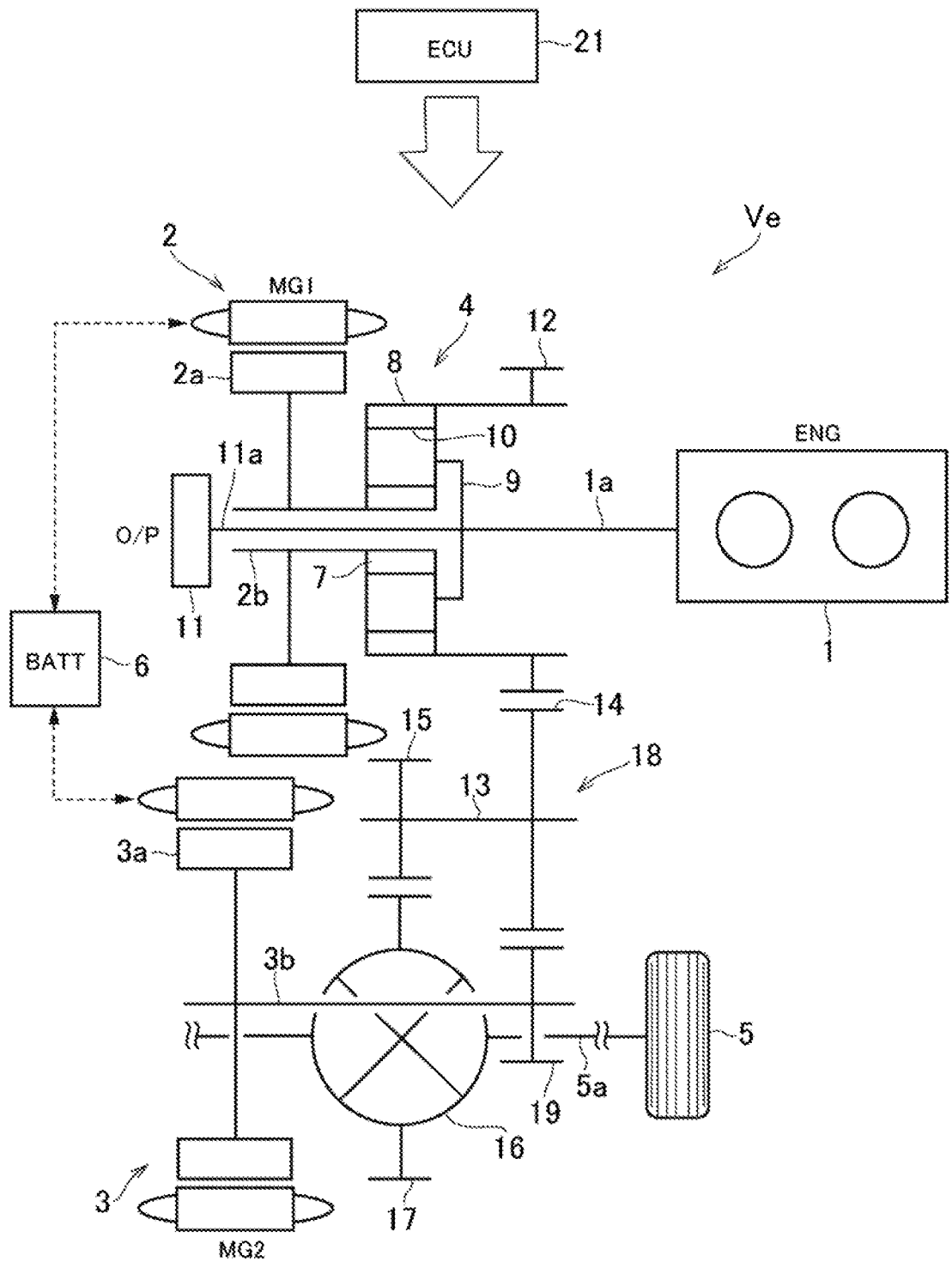
FIG. 1 is a schematic illustration showing one example of a powertrain of the hybrid vehicle to which the control system according to the exemplary embodiment of the present disclosure is applied.

Preferred embodiments of the present disclosure will now be explained with reference to the accompanying drawings. Referring now to FIG. 1, there is shown one example of a powertrain of a hybrid vehicle (as will be simply called the "vehicle" hereinafter) Ve to which the control system according to the exemplary embodiment of the present disclosure is applied. A prime mover of the vehicle Ve comprises an engine (referred to as ENG in FIG. 1) 1, a first motor (referred to as MG1 in FIG. 1) 2, and a second motor (referred to as MG2 in FIG. 1) 3. In the vehicle Ve, an output power of the engine 1 is distributed to the first motor 2 and drive wheels 5 through a power split mechanism 4. An electric power generated by the first motor 2 may be supplied to the second motor 3 to generate torque, and a drive force generated by the second motor 3 may be delivered to the drive wheels 5.

Each of the first motor 2 and the second motor 3 is a motor-generator that is operated not only as a motor to generate torque by applying electric power thereto, but also as a generator to generate electric power by applying torque thereto. For example, an AC motor such as a permanent magnet synchronous motor or an induction motor may be used as the first motor 2 and the second motor 3 respectively. The first motor 2 and the second motor 3 are electrically connected to a battery (referred to as BATT in FIG. 1) 6. A speed of the engine 1 is controlled by the first motor 2, and the second motor 3 is operated as a motor by supplying electricity generated by the first motor 2 so that the second motor 3 generates a drive force to propel the vehicle Ve.

Electricity generated by the first motor 2 and the second motor 3 is accumulated in the battery 6 as an electric storage device. For example, a secondary battery such as a nickel hydride battery, a lithium-ion battery, and a capacitor may be adopted as the battery 6. As described, the first motor 2 and the second motor 3 are connected respectively to the battery 6. Therefore, the electricity generated by the first motor 2 may be accumulated in the battery 6, and the first motor 2 may be driven as a motor by supplying electricity to the first motor 2 from the battery 6. Likewise, the electricity generated by the second motor 3 may be accumulated in the battery 6, and the second motor 3 may be driven as a motor by supplying electricity to the second motor 3 from the battery 6.

The power split mechanism 4 as a single-pinion planetary gear unit is disposed between: the engine 1 and the first motor 2; and the drive wheels 5 to transmit torque therebetween. The power split mechanism 4 comprises a sun gear 7 as a reaction element, a ring gear 8 as an output element arranged concentrically with the sun gear 7, a plurality of pinion gears 10 interposed between the sun gear 7 and the ring gear 8, and a carrier 9 as an input element supporting the pinion gears 10 in a rotatable and revolvable manner.

The power split mechanism 4 is arranged coaxially with the engine 1 and the first motor 2. Specifically, an output shaft 1a of the engine 1 is connected to the carrier 9 of the power split mechanism 4 so that the output shaft 1a serves as an input shaft of the power split mechanism 4. In order to cool and lubricate the power split mechanism 4, and to reduce fevers of the first motor 2 and the second motor 3 resulting from an iron loss or a copper loss, an oil pump 11 is arranged on an opposite side of the engine 1 across the power split mechanism 4. Specifically, the carrier 9 of the power split mechanism 4 is also connected to a rotary shaft 11a of the oil pump 11 so that the oil pump 11 is driven by the engine 1 to generate hydraulic pressure.

The first motor 2 is disposed between the oil pump 11 and the power split mechanism 4, and in the first motor 2, a hollow rotor shaft 2b that is rotated integrally with a rotor 2a is connected to a hollow rotary shaft of the sun gear 7 of the power split mechanism 4. The rotary shaft 11a of the oil pump 11 penetrates through the rotor shaft 2b and the sun gear 7 to be connected to the output shaft 1a of the engine 1.

A first drive gear 12 as an external gear is integrally formed around the ring gear 8 of the power split mechanism 4 to serve as an output member, and a countershaft 13 is arranged in parallel with a common rotational axis of the power split mechanism 4 and the first motor 2. A counter driven gear 14 diametrically larger than the first drive gear 12 is fitted onto one end of the countershaft 13 (i.e., right side in FIG. 1) to be rotated integrally therewith while being meshed with the first drive gear 12 so that torque transmitted from the first drive gear 12 is multiplied. A counter drive gear (i.e., a final drive gear) 15 is fitted onto the other end of the countershaft 13 (i.e., left side in FIG. 1) in such a manner as to be rotated integrally therewith while being meshed with a differential ring gear (i.e., a final driven gear) 17 of a deferential gear unit 16 as a final reduction. Thus, the ring gear 8 of the power split mechanism 4 is connected to a driveshaft 5a and the drive wheel 5 through an output gear train 18 including the first drive gear 12, the countershaft 13, the counter driven gear 14, the counter drive gear 15, and the differential ring gear 17.

In the power train of the vehicle Ve, an output torque of the second motor 3 can be added to the torque delivered from the power split mechanism 4 to the driveshaft 5a. To this end, a rotor 3a of the second motor 3 is connected to a rotor shaft 3b extending in parallel with the countershaft 13 to rotate integrally therewith, and a second drive gear 19 is fitted onto a leading end of the rotor shaft 3b to be rotated integrally therewith while being meshed with the counter driven gear 14. Thus, the ring gear 8 of the power split mechanism 4 is connected to the second motor 3 through the differential ring gear 17 and the second drive gear 19. That is, the ring gear 8 and the second motor 3 are individually connected to the drive wheel 5 through the differential ring gear 17 and the driveshaft 5a.

Figure 2:
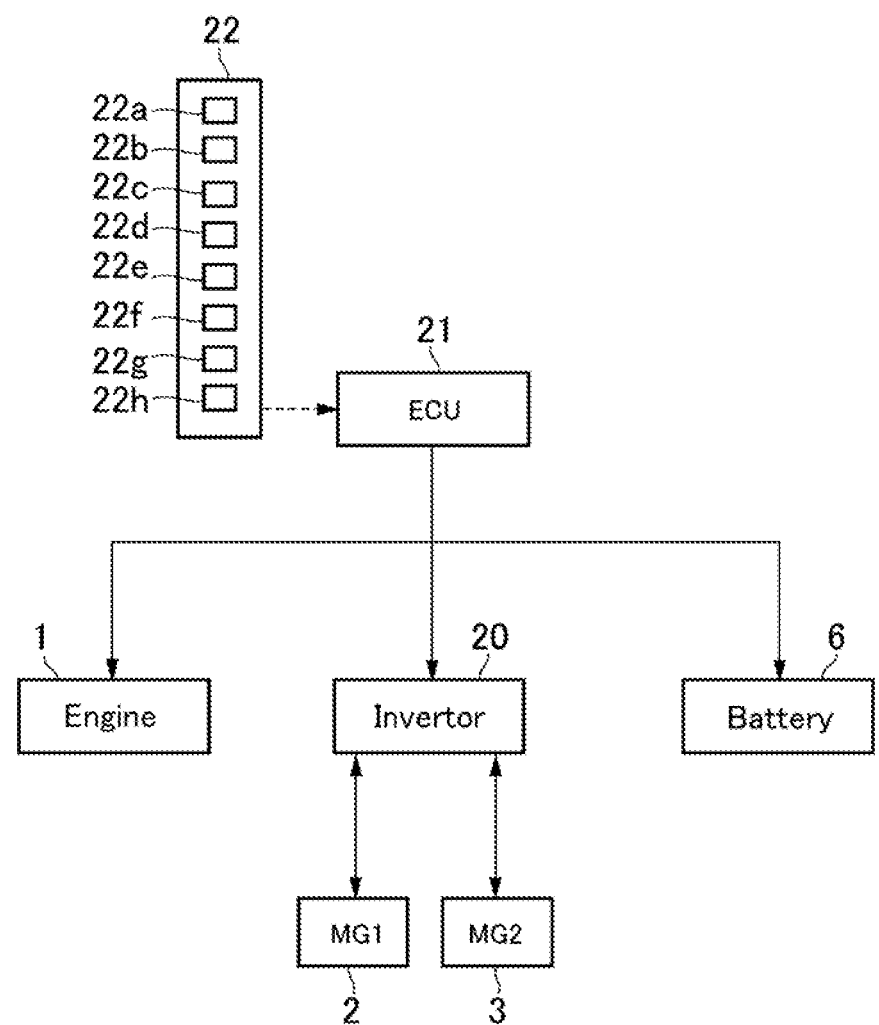
FIG. 2 is a block diagram showing one example of a control system of the vehicle shown in FIG. 1.

Since the prime mover of the vehicle Ve comprises the engine 1 and the motors 2 and 3, an operating mode of the vehicle Ve may be selected from a plurality of modes. A control system for selecting the operating mode of the vehicle Ve will be explained with reference to FIG. 2. An opening degree of a throttle valve, an ignition timing of the engine 1 and so on may be controlled electrically. The first motor 2 and the second motor 3 are individually connected to an inverter 20 so that the first motor 2 and the second motor 3 are selectively operated as a motor or a generator. As described, the electricity generated by the first motor 2 and the second motor 3 may be accumulated in the battery 6, and the electricity may be supplied to the first motor 2 and the second motor 3 from the battery 6.

The engine 1, the first motor 2, the second motor 3, the battery 6, the inverter 20 and so on are controlled by an electronic control unit (to be abbreviated as the "ECU" hereinafter) 21 as a controller. The ECU 21 is configured having a microcomputer as its main constituent, and detection signals from a detector 22 and information signals from on-board units are transmitted to the ECU 21. The ECU 21 receives the detection signals from the detector 22 including an airflow sensor 22a that detects an air intake amount, an accelerator sensor 22b that detects a depression of an accelerator pedal as a drive demand, a brake sensor 22c that detects a depression of a brake pedal, an engine speed sensor 22d that detects a rotational speed of the output shaft 1a of the engine 1, a motor speed sensor 22e that detects rotational speeds of the first motor 2 and the second motor 3, a torque sensor 22f that detects torques of the engine 1, the first motor 2, and the second motor 3, an SOC sensor 22g that detects a state of charge (to be abbreviated as "SOC" hereinafter) level of the battery 6, a vehicle speed sensor 22h that detects a speed of the vehicle Ve and so on. In addition, a map for determining the operating mode, a map for determining an operating point of the engine 1 in an optimally fuel efficient manner, a map for determining a required power and so on are installed in the ECU 21. The ECU 21 is configured to carry out a calculation based on the incident signals from the detector 22 and the data installed in advance such as the above-mentioned maps, and transmit a calculation result in the form of command signal. Optionally, a plurality of the ECUs may be arranged in the vehicle Ve according to need.

As described, the operating mode of the vehicle Ve may be selected from a plurality of modes by controlling the engine 1, the first motor 2, and the second motor 3 by the ECU 21, with reference to the map determining the operating mode based on a required drive force and a vehicle speed. Specifically, the operating mode of the vehicle Ve may be selected from a hybrid mode (to be abbreviated as the "HV mode" hereinafter) in which the vehicle Ve is powered by the engine 1, and an electric vehicle mode (to be abbreviated as "EV mode" hereinafter) in which the vehicle Ve is powered by the first motor 2 and the second motor 3 while supplying electricity to the motors 2 and 3 from the battery 6.

According to the conventional control of the engine in the hybrid vehicle, when the accelerator pedal being depressed is returned, a torque of the engine is reduced promptly to meet such deceleration demand, while reducing a speed of the engine by the first motor in such a manner as to reduce vibrations and noises. However, if torque or power of the engine is reduced linearly in response to the deceleration demand, polluting emission may be increased. In a gasoline engine, fuel is injected to cylinders in accordance with air intake. Therefore, if the throttle valve is completely closed immediately when the depressed accelerator pedal is returned, the polluting emission may be increased. In this situation, specifically, the air intake is reduced abruptly thereby increasing an estimated error of the air intake. Consequently, the fuel may not be injected in an appropriate amount, and air/fuel ratio may be changed improperly. In order to avoid such disadvantage, the control system according to the exemplary embodiment is configured to control an engine torque and an engine speed (i.e., an output power of the engine) in such a manner as to prevent an increase in the polluting emission during deceleration of the vehicle Ve.

Figure 3:
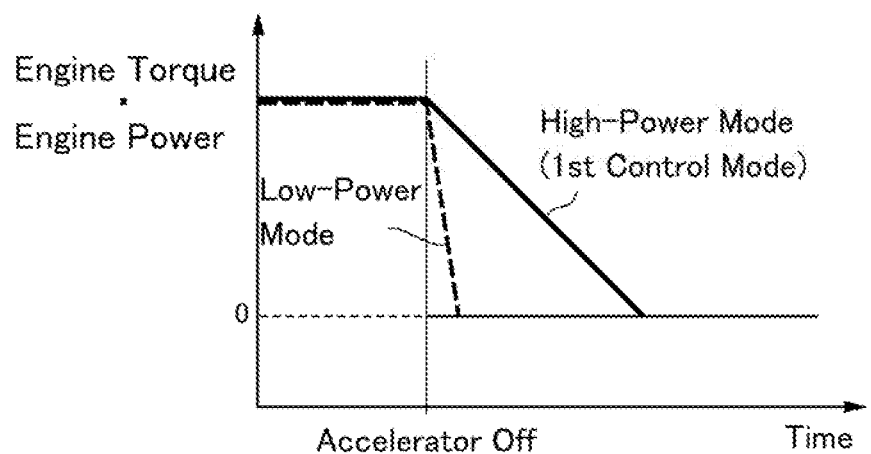
FIG. 3 is a graph indicating changes in an engine torque or an engine output during deceleration of the vehicle in a high-power mode and a low-power mode.

FIG. 3 is a graph indicating a reduction in an engine torque or an engine power during deceleration of the vehicle. In FIG. 3, the dashed-line indicates the engine torque or the engine power reduced by a conventional control at a predetermined rate determined taking account of vibrations and noises resulting from rattling of gears, and the solid line indicates the engine torque or the engine power reduced in a first control mode at a rate slower than the predetermined rate of the conventional control determined taking account of the exhaust emission performance. In the following explanation, the above-mentioned conventional control will be called the "low-power mode".

As indicated in FIG. 3, in the conventional low-power mode indicated by the dashed-line, the engine torque or the engine power is reduced when the accelerator pedal is returned at the relatively faster rate when the accelerator pedal is returned to decelerate the vehicle Ve. By contrast, in the first control mode indicated by the solid line, the engine torque or the engine power is reduced when the accelerator pedal is returned at the relatively slower rate in order not to increase the polluting emission. That is, although the vehicle is started to be decelerated when the accelerator pedal is returned, the engine 1 is controlled irrespective of an operation of the accelerator pedal in such a manner as to gradually reduce the engine torque or the engine power. During deceleration of the vehicle Ve, an engine speed is controlled by the first motor 2, and a regenerative torque of the second motor 3 is applied as a brake torque to the drive wheels 5. Consequently, the battery 6 is charged with the electricity regenerated by the second motor 3.

Figure 4:
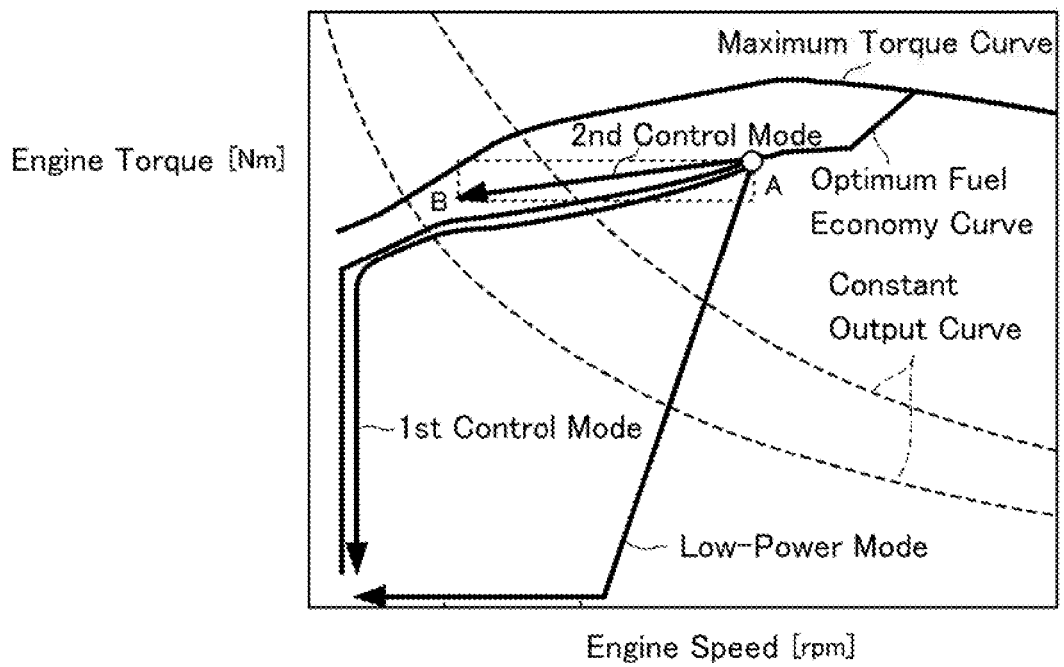
FIG. 4 is a map for controlling the engine in a first control mode, a second control mode, and a low-power mode.

In addition, in the first control mode, the engine 1 is controlled in such a manner as to reduce fuel consumption. Specifically, a torque and a speed of the engine 1 are controlled in an optimally fuel efficient manner with reference to the map installed in the ECU 21. FIG. 4 is a map for determining an operating point of the engine 1 which is governed by a torque and a speed of the engine 1 during deceleration of the vehicle Ve in each control mode.

In the first control mode, a torque and a speed of the engine 1 are controlled in such a manner that the operating point of the engine 1 is shifted along an optimum fuel economy curve. Specifically, the optimum fuel economy curve is determined by connecting optimum operating points of the engine 1 found based on an experimental result in a map determining the operating point based on a torque and a speed of the engine 1. The engine 1 can be operated in an optimally fuel efficient manner by controlling the torque and the speed of the engine 1 to adjust the operating point of the engine 1 to an intersection between a constant output curve of the engine power and the optimum fuel economy curve in the map shown in FIG. 4. That is, a target speed and a target torque can be determined based on the operating point at the above-mentioned intersection. For example, the operating point of the engine 1 may be shifted to a desired point by controlling the speed of the engine 1 by the first motor 2 while controlling the torque of the engine 1 by controlling an opening degree of the throttle valve.

That is, in the first control mode, the engine 1 can be operated in the most efficient manner while optimizing the emission characteristics and fuel efficiency. Accordingly, if operating conditions of the battery 6, the first motor 2, and the second motor 3 are not restricted, the first control mode is selected to control the engine 1. On the other hand, in the low-power mode, the torque and the speed of the engine 1 (i.e., the engine power) are reduced promptly in response to a deceleration demand as shown in FIG. 4.

When decelerating the vehicle Ve, it is preferable to control the engine 1 in the first control mode. However, in the first control mode, the vehicle Ve is decelerated while maintaining an output power of the engine 1 to adjust the operating point of the engine 1 to the optimum fuel economy curve. In this situation, the second motor 3 is required to generate a brake torque greater than the output torque of the engine 1, and consequently, an amount of regenerated energy will be increased. That is, if an SOC level of the battery 6 is higher than a predetermined level when controlling the engine 1 in the first control mode, an overcharging of the battery 6 would be caused. In this situation, an input power (Win) possible to be accumulated in the battery 6 may be restricted depending on a condition of the battery 6. Further, a power control unit (to be abbreviated as the "PCU") including the inverter 20 and a converter would be overheated depending on a condition. In order to avoid such disadvantages, according to the exemplary embodiment of the present disclosure, the control mode of the engine 1 is selected in accordance with the conditions of the battery 6, the first motor 2, and the second motor 3.

Figure 5A:
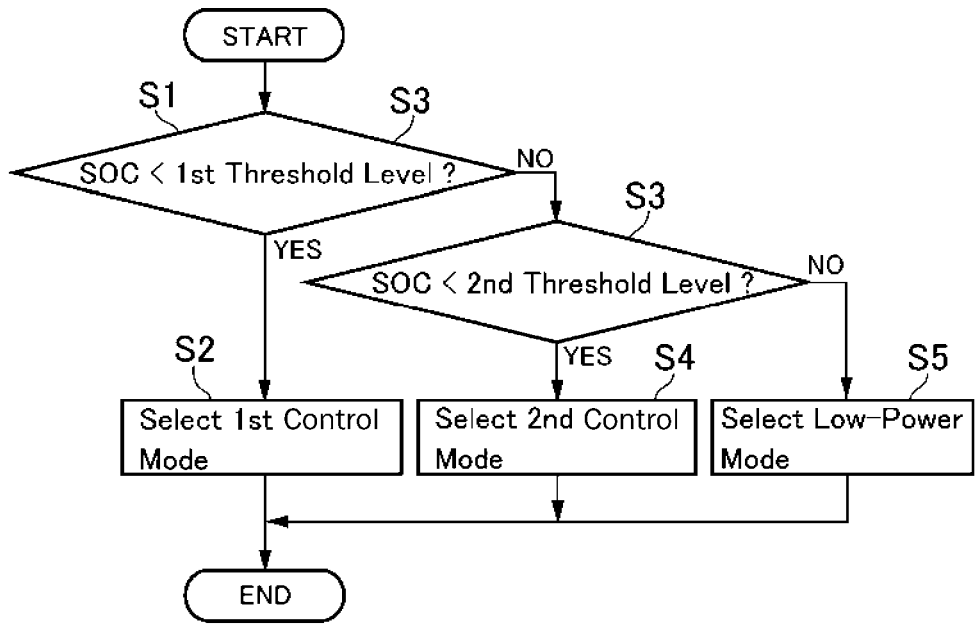
FIG. 5A is a flowchart showing a routine for selecting the control mode of the engine based on a state of charge level.
Figure 6A:
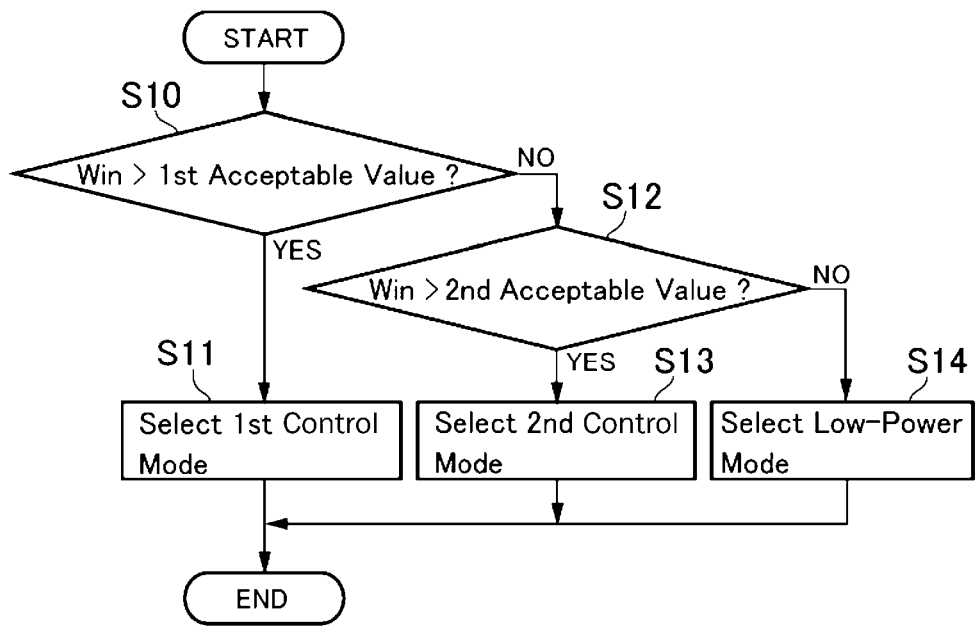
FIG. 6A is a flowchart showing a routine for selecting the control mode of the engine based on an input power to a battery.
Figure 6B:
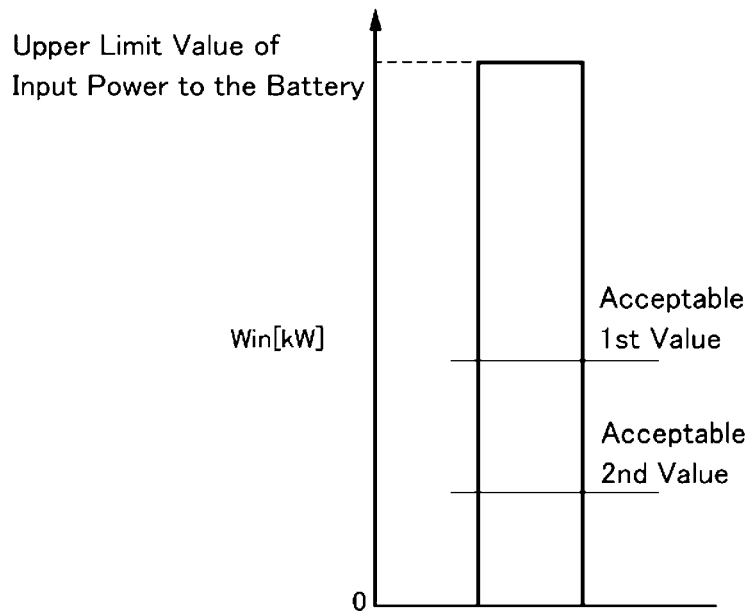
FIG. 6B is a graph showing threshold levels of the input power.
Figure 7A:
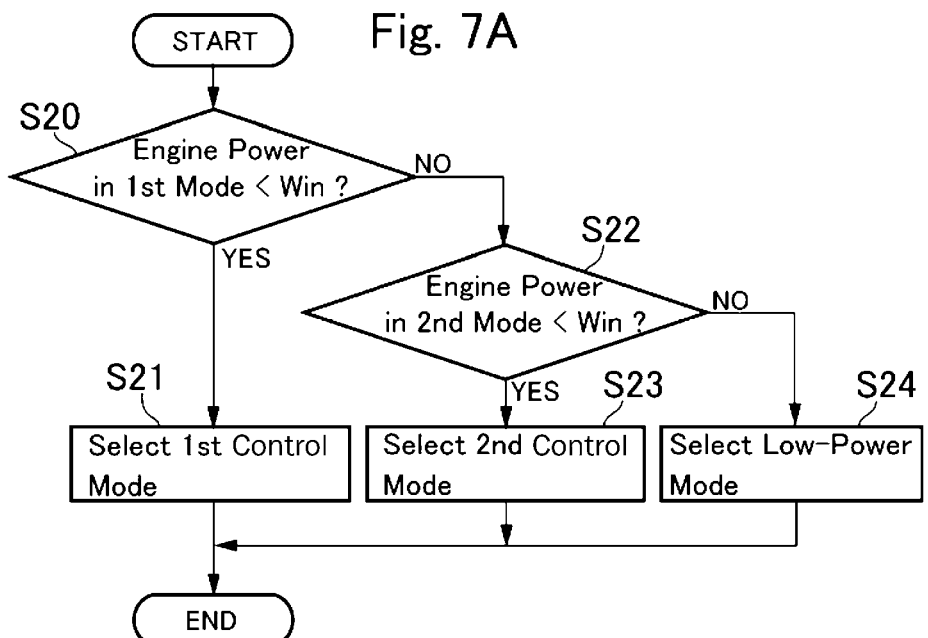
FIG. 7A is a flowchart showing a routine for selecting the control mode of the engine based on an output power of the engine.
Figure 7B:
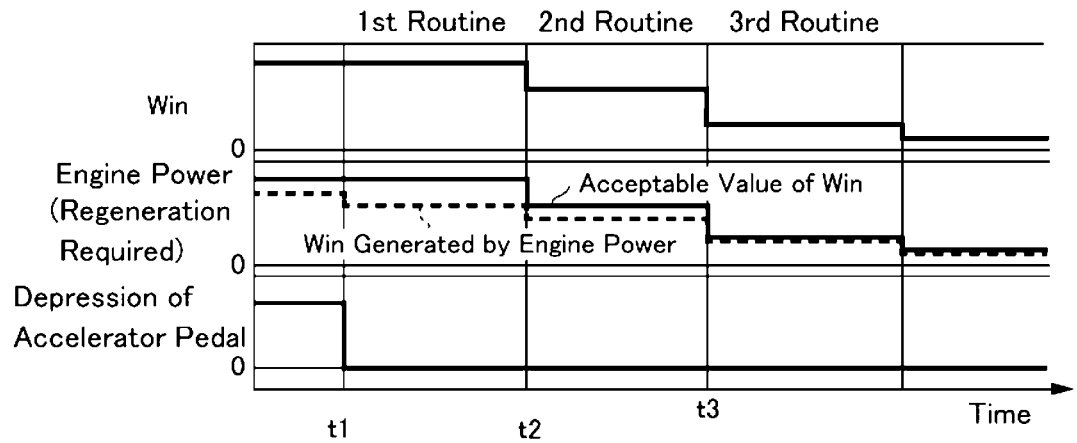
FIG. 7B is a time chart indicating temporal changes in the input power, the output power of the engine, and a depression of an accelerator pedal.
Figure 7C:
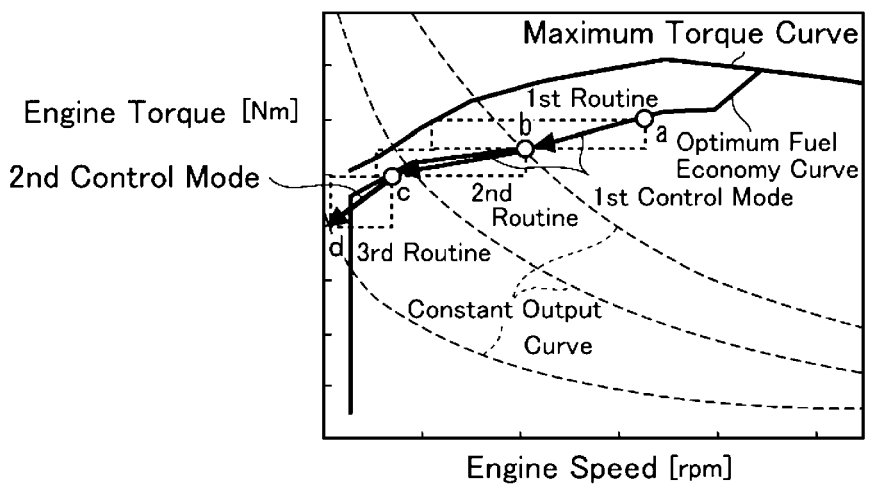
FIG. 7C is a map determining an operating point of the engine during execution of the routine shown in FIG. 7A.
Figure 8:
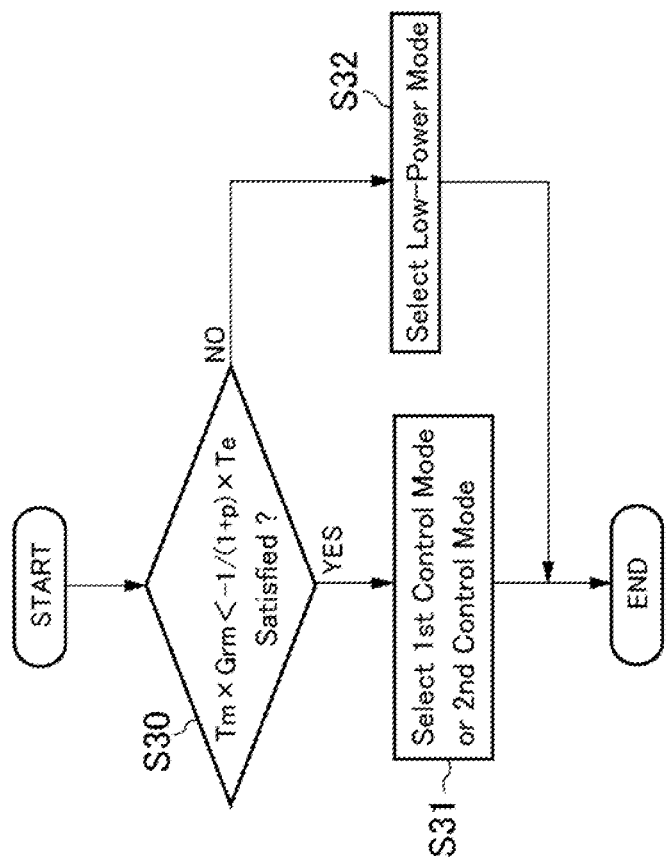
FIG. 8 is a flowchart showing a routine for selecting the control mode of the engine based on a possible output torque of the second motor.

Examples of the routines for selecting the control mode of the engine 1 depending on the conditions of the battery 6, the first motor 2, and the second motor 3 are shown in FIGS. 5A to 8. Specifically, FIGS. 5A and 5B show an example of the routine for selecting the control mode of the engine 1 depending on an SOC level of the battery 6, FIGS. 6A to 7C show examples of the routines for selecting the control mode of the engine 1 depending on an input power (Win) possible to be accumulated in the battery 6, and FIG. 8 shows an example of the routine for selecting the control mode of the engine 1 depending on the conditions of the first motor 2, the second motor 3, and the PCU. Those routines are repeated at predetermined intervals.

Figure 5B:
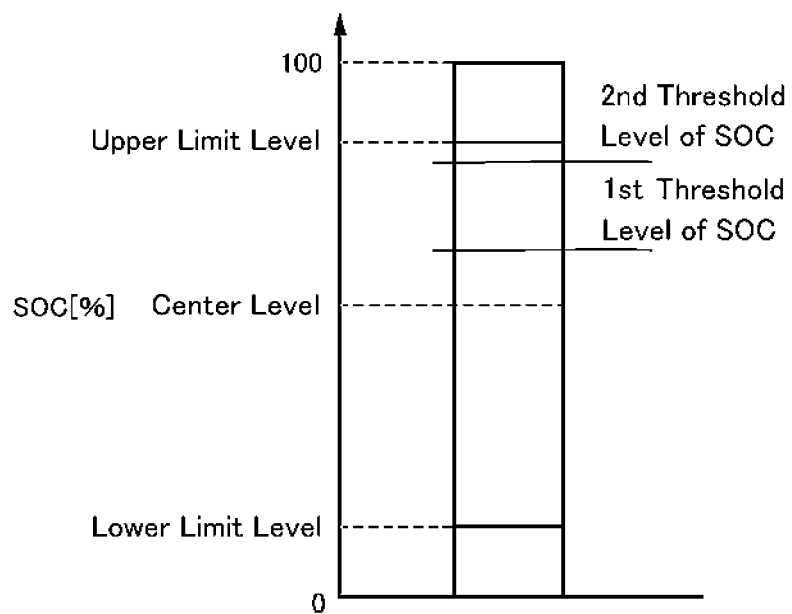
FIG. 5B is a graph showing threshold levels of the state of charge level.

FIG. 5A shows the routine for selecting the control mode of the engine 1 depending on an SOC level of the battery 6, and FIG. 5B shows a graph indicating threshold levels of the SOC level of the battery 6. At step S1, it is determined whether the SOC level of the battery 6 is lower than a first threshold level. As indicated in FIG. 5B, in order to limit damage on the battery 6, the SOC level of the battery 6 is controlled to fall between a lower limit level and an upper limit level. As explained later, the control system according to the exemplary embodiment is configured to select the control mode of the engine 1 plurality of times until the speed of the vehicle Ve is reduced to a target speed by repeating the routine for selecting the control mode of the engine 1 while observing e.g., the SOC level of the battery 6. For example, given that the current routine is executed for the first time in response to the acceleration demand, it is determined at step S1 whether the SOC level of the battery 6 is lower than the first threshold level when the accelerator pedal being depressed is returned. If the SOC level of the battery 6 is lower than the first threshold level so that the answer of step S1 is YES, the control system determines that a spare capacity of the battery 6 is sufficiently available. In this case, therefore, the routine progresses to step S2 to select the first control mode to control the engine 1. Consequently, the engine 1 is controlled in such a manner as to optimize the emission characteristics while regenerating energy.

By contrast, if the SOC level of the battery 6 is higher than the first threshold level when e.g., the accelerator pedal is returned so that the answer of step S1 is NO, the routine progresses to step S3 to determine whether the SOC level of the battery 6 is lower than a second threshold level. Specifically, as shown in FIG. 5B, the second threshold level is set to a level closer to the upper limit level than the first threshold level. If the SOC level of the battery 6 is equal to or higher than the first threshold level but lower than the second threshold level (first threshold level≤SOC<second threshold level) so that the answer of step S3 is YES, the routine progresses to step S4 to select a second control mode to control the engine 1.

In the second control mode, the engine 1 is controlled in such a manner as to reduce the polluting emission while restricting a charging amount of the battery 6 (i.e., a regeneration amount) within a predetermined range that is smaller than that in the first control mode, during deceleration of the vehicle Ve. Specifically, in the second control mode, a change rate (i.e., a time rate of change) of the output power of the engine 1 during deceleration of the vehicle Ve is faster than that in the second control mode, but slower than that in the low-power mode. That is, the engine 1 is allowed to generate a higher power in the first control mode and the second control mode compared to the low-power mode. Accordingly, the first control mode and the second control mode correspond to the "high-power mode" of the exemplary embodiment.

As shown in FIG. 4, in the second control mode, a torque and a speed of the engine 1 are controlled such that the operating point of the engine 1 is shifted within the region enclosed by the dashed line where the polluting emission can be reduced along the diagonal arrow. It was found that the polluting emission is not increased significantly by reducing the speed of the engine 1 within the region enclosed by the dashed line, but increased considerably by reducing the torque of the engine 1 within the region enclosed by the dashed line. In the second control mode, therefore, the torque of the engine 1 is reduced at a rate slower than the change rate in the low-power mode to suppress emission of the polluting gas. In other words, in the second control mode, the torque and the speed of the engine 1 are controlled in such a manner that the polluting emission will not be increased. In the map shown in FIG. 4, the output power of the engine 1 is reduced by reducing the speed of the engine 1 thereby reducing the regeneration amount. In the second control mode, specifically, the torque of the engine 1 is reduced at a substantially same rate as in the first control mode, but the speed of the engine 1 is reduced at a faster rate than the change rate in the first control mode. In the second control mode, therefore, the regeneration amount may fall within the desired range while suppressing emission of the polluting gas. As described, in the second control mode, the output power of the engine 1 is reduced at a slower rate during deceleration of the vehicle Ve than the change rate in the low-power mode.

More specifically, in the second control mode, the operating point of the engine 1 is shifted to pass through a lowest point (i.e., the point B in FIG. 4) in the region enclosed by the dashed line in response to the decelerating operation. As described, the control system is configured to select the control mode of the engine 1 plurality of times until the speed of the vehicle Ve is reduced to a target speed by repeating the routine for selecting the control mode of the engine 1 while observing e.g., the SOC level of the battery 6. For example, in the map shown in FIG. 4, the operating point of the engine 1 is situated at point A when the accelerator pedal is returned. In this situation, given that the SOC level of the battery 6 is situated between the first threshold level and the second threshold level so that the second control mode is selected, the operating point of the engine 1 is shifted from the point A to the aforementioned point B during the first routine. Likewise, during the second or subsequent routine(s), the operating point of the engine 1 will be shifted within another region of lower side (not shown) where the polluting emission may also be reduced while passing through the lowest point in another region.

Otherwise, if the SOC level of the battery 6 is higher than the second threshold level when e.g., the accelerator pedal is returned so that the answer of step S3 is NO, the routine progresses to step S5 to select the low-power mode to control the engine 1. In this case, the SOC level of the battery 6 is situated close to the upper limit level, therefore, the torque and the speed of the engine 1 are reduced promptly in the low-power mode.

Next, here will be explained an example of selecting the control mode of the engine 1 based on an input power (Win) possible to be accumulated in the battery 6 with reference to FIGS. 6A and 6B. FIG. 6A shows the routine for selecting the control mode of the engine 1 depending on an acceptable value of the input power (Win) to the battery 6, and the input power (Win) may be calculated based on an SOC level and a temperature of the battery 6. For example, if the SOC level of the battery 6 is significantly high, if the temperature of the battery 6 is significantly low, or if the temperature of the battery 6 is significantly high, an acceptable value of the input power (Win) to the battery 6 may be restricted. In addition, a lithium deposition may be caused if the battery 6 is charged in a condition where electrolysis solution is locally clotted in the battery 6. In order to avoid an occurrence of such lithium deposition, the acceptable value of the input power (Win) to the battery 6 may also be restricted. The acceptable values of the input power (Win) to the battery 6 are shown in FIG. 6B. As can be seen from FIG. 6B, a first acceptable value is set when the input power (Win) to the battery 6 is restricted but the acceptable value of the input power (Win) to the battery 6 is relatively large. On the other hand, a second acceptable value is set when the input power (Win) to the battery 6 is restricted to a value smaller than the first acceptable value.

In the routine shown in FIG. 6A, at step S10, it is determined whether the acceptable input power (Win) to the battery 6 when e.g., the accelerator pedal is returned is greater than a first acceptable value. If the acceptable value of the input power (Win) to the battery 6 is greater than the first acceptable value so that the answer of step S10 is YES, the control system determines that a spare capacity of the battery 6 is sufficiently available. In this case, therefore, the routine progresses to step S11 to select the first control mode to control the engine 1.

By contrast, if the acceptable value of the input power (Win) to the battery 6 is smaller than the first acceptable value so that the answer of step S10 is NO, the routine progresses to step S12 to determine whether the acceptable value of the input power (Win) to the battery 6 is greater than the second acceptable value. If the acceptable value of the input power (Win) to the battery 6 is smaller than the first acceptable value but greater than the second acceptable value so that the answer of step S12 is YES, the routine progresses to step S13 to select the second control mode to control the engine 1. In this case, the engine 1 is controlled in such a manner as to restrict the regeneration amount within the desired range while suppressing emission of the polluting gas.

By contrast, if the acceptable value of the input power (Win) to the battery 6 is smaller than the second acceptable value so that the answer of step S12 is NO, the routine progresses to step S14 to select the low-power mode to control the engine 1. In this case, since the acceptable value of the input power (Win) to the battery 6 is very small, the torque and the speed of the engine 1 are reduced promptly in the low-power mode.

As described, in the first control mode, the torque and the speed of the engine 1 are controlled in such a manner as to optimize the fuel economy. If the condition is not allowed to select the first control mode, it is preferable to control the engine 1 in the second control mode. Therefore, it is preferable to select the first control mode or the second control mode preferentially in accordance with the current acceptable value of the input power (Win) to the battery 6.

An example of the routine for selecting the control mode of the engine 1 in accordance with the current acceptable value of the input power (Win) to the battery 6 is shown in FIG. 7A. At step S20, it is determined whether the input power (Win) to the battery 6 given that the operating point of the engine 1 is adjusted to the optimum fuel economy curve in the first control mode is smaller than the current acceptable value of the input power (Win) to the battery 6. As described, the current acceptable value of the input power (Win) to the battery 6 may be determined based on the temperature and the SOC level of the battery 6. In a case that the input power (Win) to the battery 6 given that the engine 1 is controlled in the first control mode is smaller than the current acceptable value of the input power (Win) to the battery 6 so that the answer of step S20 is YES, the control system determines that the engine 1 can be controlled in the first control mode. In this case, therefore, the routine progresses to step S21 to select the first control mode to control the engine 1.

By contrast, in a case that the input power (Win) to the battery 6 given that the engine 1 is controlled in the first control mode is greater than the current acceptable value of the input power (Win) to the battery 6 so that the answer of step S20 is NO, the routine progresses to step S22 to determine whether the input power (Win) to the battery 6 given that the engine 1 is controlled in the second control mode is smaller than the current acceptable value of the input power (Win) to the battery 6. In a case that the input power (Win) to the battery 6 given that the engine 1 is controlled in the second control mode is smaller than the current acceptable value of the input power (Win) to the battery 6 so that the answer of step S22 is YES, the routine progresses to step S23 to select the second control mode to control the engine 1.

By contrast, in a case that the input power (Win) to the battery 6 given that the engine 1 is controlled in the second control mode is greater than the current acceptable value of the input power (Win) to the battery 6 so that the answer of step S22 is NO, the engine 1 may not be controlled not only in the first control mode but also in the second control mode. In this case, the routine progresses to step S24 to select the low-power mode to control the engine 1. Consequently, the torque and the speed of the engine 1 are reduced promptly in the low-power mode.

FIG. 7B shows an example of changes in the acceptable value of the input power (Win) to the battery 6 and the output power of the engine 1 during execution of the routine shown in FIG. 7A three times. In the example shown in FIG. 7B, the engine 1 is controlled in the first control mode during execution of the first routine and the second routine, and controlled in the second control mode during execution of the third routine. When the accelerator pedal is returned at point t1, the first control mode is started to control the engine 1. Consequently, the battery 6 is charged by the electric power regenerated by operating the engine 1 in the first control mode so that the acceptable value of the input power (Win) to the battery 6 is reduced. Specifically, a difference between the acceptable value of the input power (Win) to the battery 6 indicated by the solid line and the electric power regenerated by the output power of the engine 1 indicated by the dashed line is reduced at point t2. Eventually, the solid line representing the acceptable value of the input power (Win) to the battery 6 is overlapped with the dashed line representing the electric power regenerated by the output power of the engine 1 at point t3. Consequently, the control mode of the engine 1 is shifted to the second control mode from point t3.

FIG. 7C shows a map same as the map shown in FIG. 4. As shown in FIG. 7C, when the accelerator pedal is returned, the operating point of the engine 1 is shifted from the point "a" toward the point "b" within the region enclosed by the dashed line. Specifically, the first control mode is selected during execution of the first routine so that the operating point is shifted along the optimum fuel economy curve. Likewise, during execution of the second routine, the operating point of the engine 1 is shifted from the point "b" toward the point "c" also along the optimum fuel economy curve. Eventually, the battery 6 is charged to the current acceptable value and the engine 1 may be no longer controlled in the first control mode, therefore, the control mode is shifted to the second control mode. Consequently, the engine 1 is controlled in such a manner that the operating point passes through the point "d" as a lowest point in the region corresponding to the third routine enclosed by the dashed line. In this situation, if a required output power of the engine 1 cannot be achieved at the lowest point in the region corresponding to the third routine, the low-power mode is selected in the third routine. In addition, in order to avoid an overcharging of the battery 6, it is preferable to control the engine 1 based on the acceptable value of the input power Win·(α<1) to the battery 6 calculated by multiplying the acceptable value by a predetermined safety factor.

Next, here will be explained an example of controlling the engine 1 in accordance with the conditions of the first motor 2, the second motor 3, the inverter 20 and so on. For example, if a current is excessively applied only to a specific phase or element of the inverter 20, the first motor 2 and the second motor 3 may be heated and thermally damaged. As a result, output powers of the first motor 2 and the second motor 3 will be limited. In this situation, for example, the second motor 3 may not generate a required brake torque even if the first control mode is selected to control the engine 1. In the powertrain of the vehicle Ve, an output shaft torque Tp can be expressed by the following equation of motion:

$$Tp = Tm \cdot Grm + 1/(1+\rho) \cdot Te \quad (1);$$

and an engine torque Te can be expressed as:

$$Te = -(1+\rho)/\rho \cdot Tg \quad (2),$$

where Tg is a torque of the first motor 2, Tm is a torque of the second motor, ρ is a gear ratio between the sun gear 7 and the ring gear 8 of the power split mechanism 4, and Grm is a gear ratio of the second motor 3.

In order to decelerate the vehicle Ve, the torque Tp of the output shaft 1a has to be reduced less than zero. As described, in the first control mode, the vehicle Ve is decelerated by the second motor 3 while maintaining the output power of the engine 1 to a predetermined power. To this end, the second motor 3 has to generate a brake torque greater than the torque Te of the engine 1. An example of the routine for selecting the control mode of the engine 1 depending on the condition of the second motor 3 is shown in FIG. 8. At step S30, it is determined whether the second motor 3 is able to generate the torque Tm which can satisfy the following inequality:

$$Tm \cdot Grm < -1/(1+\rho) \cdot Te \quad (3).$$

For example, such determination at step S30 may be made based on a temperature of the second motor 3 (or the first motor 2) and a condition of the PCU. If the second motor 3 can generate the torque Tm which can satisfy the inequality so that the answer of step S30 is YES, the routine progresses to step S31 to select the first control mode.

In this case, the vehicle Ve can be decelerated while regenerating energy. Therefore, in the case that the answer of step S30 is YES, it is also possible to select the second control mode. By contrast, if the second motor 3 cannot generate the torque Tm which can satisfy the inequality so that the answer of step S30 is NO, the routine progresses to step S32 to select the low-power mode. In this case, the torque and the speed of the engine 1 are reduced promptly.

For example, the second motor 3 cannot generate the torque Tm required to satisfy the inequality if the temperature of the second motor 3 is out of the predetermined range, the temperature of the PCU is too high, or a current value applied to the inverter 20 is too high. Therefore, the determination at step S30 may also be made on the basis of the temperature of e.g., the second motor 3.

Thus, according to the exemplary embodiment, the control system is configured to select the first control mode to control the engine 1 when the battery 6 can accept the input power sufficiently and the second motor 3 is allowed to generate a required torque. As described, in the first control mode, the operating point of the engine 1 is shifted along the optimum fuel economy curve, and the air intake to the engine 1 is reduced slowly compared to the low-power mode in which the speed and the torque of the engine 1 are reduced promptly. Therefore, the air intake can be estimated accurately to control an air/fuel ratio. For this reason, emission of the polluting gas can be reduced. The control system is further configured to select the second control mode if the SOC level of the battery 6 is equal to or higher than the first threshold level but lower than the second threshold level thereby restricting a charging amount within a desired range, and to select the low-power mode if the SOC level of the battery 6 is higher than the second threshold level thereby reducing the output power of the engine 1 to reduce regenerative energy. For this reason, an overcharging of the battery 6 can be prevented to limit damage on the battery 6.

The overcharging of the battery 6 may also be prevented by selecting the control mode of the engine 1 in accordance with the acceptable input power (Win) to the battery 6.

The control system is further configured to select the control mode of the engine 1 based on the fact that the second motor 3 is in a condition possible to generate the brake torque for decelerating the vehicle Ve while maintaining the output torque of the engine 1. For this reason, the control mode of the engine 1 can be selected properly to reduce emission of the polluting gas and to protect the battery 6 depending on the condition of the second motor 3.

The control system according to the exemplary embodiment is further configured to select the control mode of the engine 1 based on a required deceleration to reduce the speed of the vehicle Ve. Examples of routines for selecting the control mode of the engine 1 in accordance with the required deceleration will be explained with reference to FIGS. 9A to 13B.

Figure 9A:
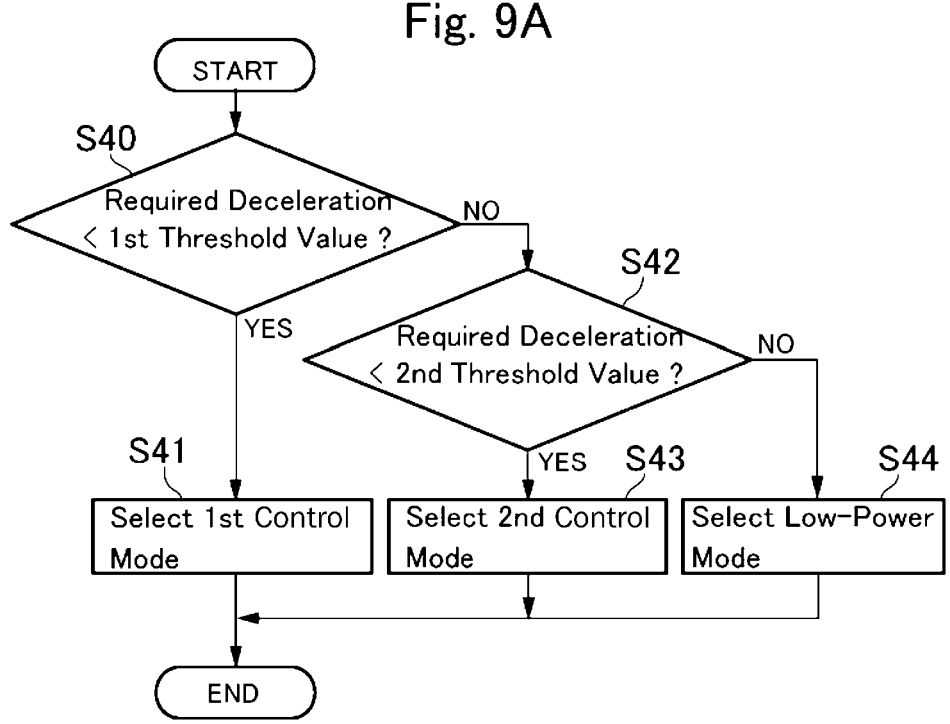
FIG. 9A is a flowchart showing a routine for selecting the control mode of the engine based on a required deceleration.
Figure 9B:
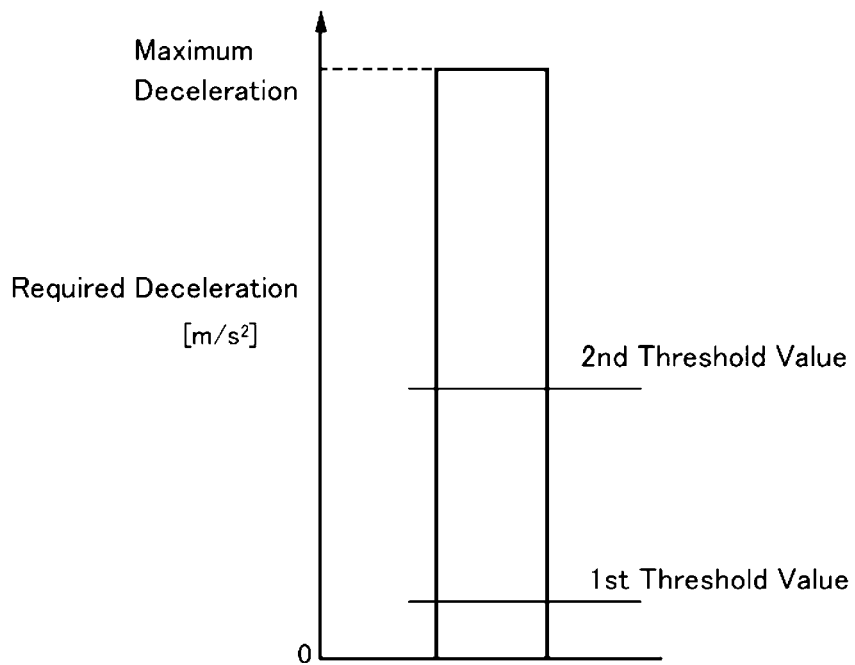
FIG. 9B is a graph showing threshold values of the required deceleration.

Turning to FIG. 9A, there is shown an example of the routine for selecting the control mode of the engine 1 in accordance with the required deceleration of the vehicle Ve in a drive range (to be abbreviated as the "D range" hereinafter. At step S40, it is determined whether the required deceleration to reduce the speed of the vehicle Ve is less than a first threshold value. As can be seen from FIG. 9B, the first threshold value is set to a relatively smaller value. Accordingly, if the required deceleration is less than the first threshold value so that the answer of step S40 is YES, the first control mode in which the torque and the speed of the engine 1 are reduced relatively slowly can be selected. In this case, therefore, the routine progresses to step S41 to select the first control mode.

By contrast, if the required deceleration is greater than the first threshold value so that the answer of step S40 is NO, the routine progresses to step S42 to determine whether the required deceleration is less than a second threshold value which is set to a value between the first threshold value and a maximum deceleration. If the required deceleration is greater than the first threshold value but less than the second threshold value so that the answer of step S42 is YES, it is necessary to decelerate the vehicle at a relatively faster rate but it is preferable to reduce emission of the polluting gas. In this case, therefore, the routine progresses to step S43 to select the second control mode.

By contrast, if the required deceleration is greater than the second threshold value so that the answer of step S42 is NO, the routine progresses to step S44 to select the low-power mode thereby reducing the torque and the speed of the engine 1 promptly.

Figure 10:
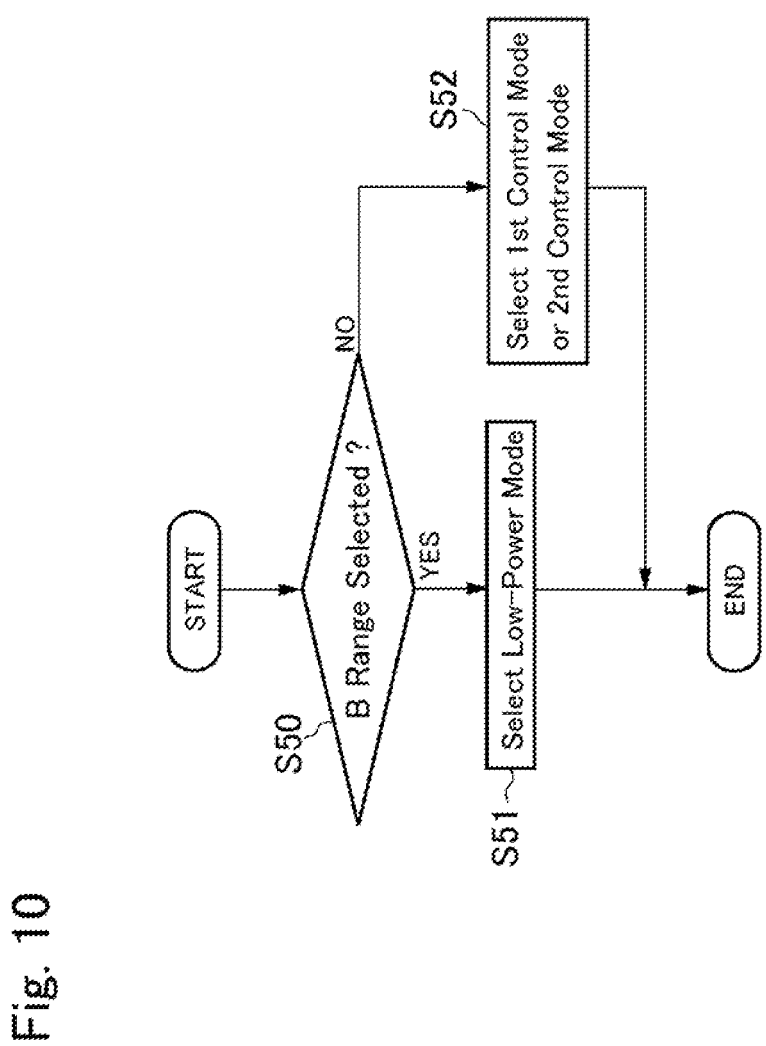
FIG. 10 is a flowchart showing a routine for selecting the control mode of the engine based on a fact that a B range is selected.

Turning to FIG. 10, there is shown an example of the routine for selecting the control mode of the engine 1 based on a fact that a so-called "B range" is selected. In the B range, an engine braking force established by a pumping loss of the engine 1 may be applied e.g., to the drive wheels 5. Therefore, when the accelerator pedal is returned in the B range, a greater braking force is applied to the vehicle Ve compared to the D range. In this situation, therefore, the output power of the engine 1 has to be limited to a lower power during deceleration of the vehicle Ve even if the first control mode or the second control mode is selected. For this reason, if the B range is currently selected to propel the vehicle Ve so that the answer of step S50 is YES, the routine progresses to step S51 to select the low-power mode thereby reducing the torque and the speed of the engine 1 promptly.

By contrast, if the B range is not selected so that the answer of step S50 is NO, the routine progresses to step S52 to select the first control mode or the second control mode in accordance with the above-explained parameters such as the SOC level of the battery 6 and so on. Instead, in the case that the answer of step S50 is NO, it is also possible to select the control mode of the engine 1 from the first control mode and the second control mode in accordance with the required deceleration.

Figure 11A:
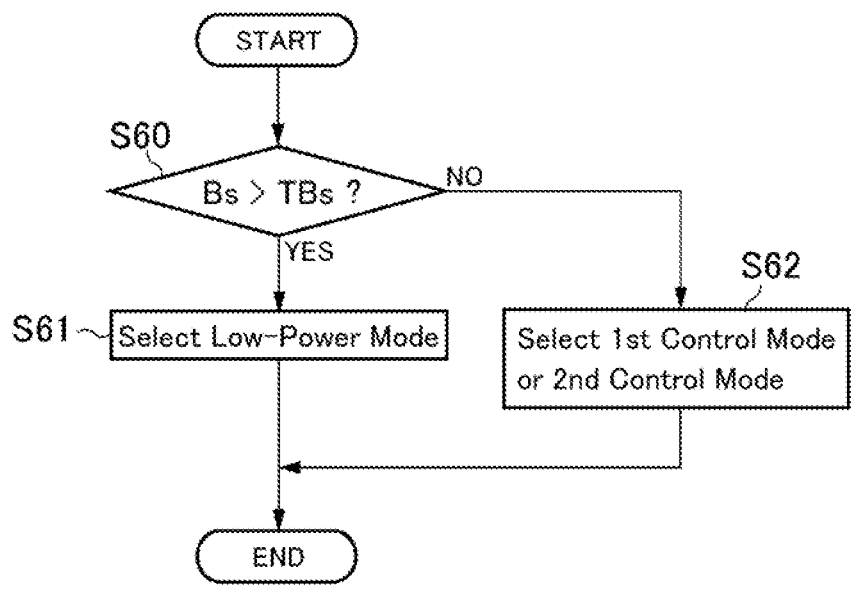
FIG. 11A is a flowchart showing a routine for selecting the control mode of the engine based on a depression of a brake pedal.
Figure 11B:
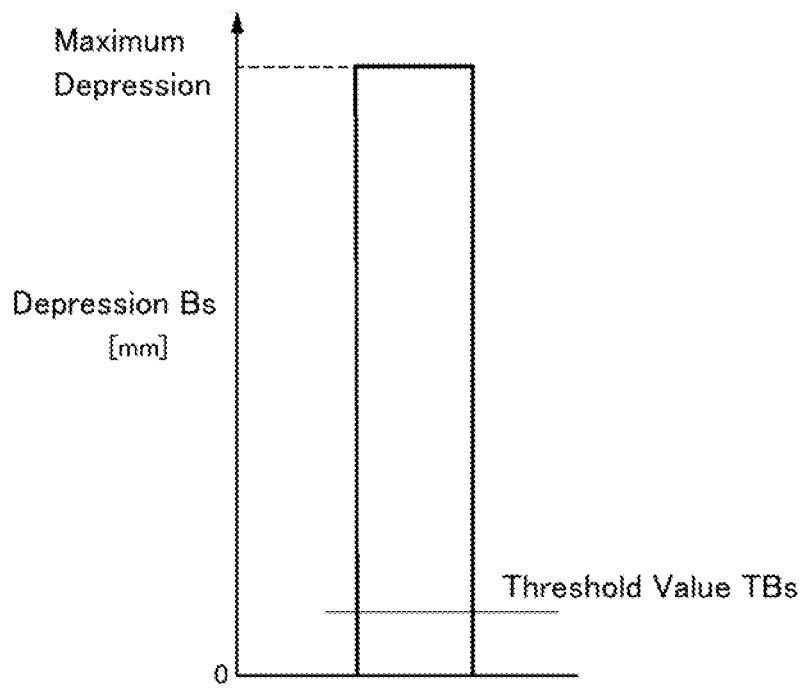
FIG. 11B is a graph showing a threshold value of the depression.

Turning to FIGS. 11A and 11B, there is shown an example of the routine for selecting the control mode of the engine 1 in accordance with an operating amount (i.e., a depression) of the brake pedal. If the brake pedal is depressed by the driver, this means that the driver has an intension to generate a greater brake force to decelerate the vehicle Ve. In this situation, it is preferable to stop the engine 1 immediately. However the driver may decelerate the vehicle Ve while changing a depression of the brake pedal to adjust a vehicle speed. Therefore, the control system according to the exemplary embodiment is further configured to select the first control mode or the second control mode to charge the battery 6 or to reduce emission, if a depression of the brake pedal is smaller than a threshold value.

In the routine shown in FIG. 11A, at step S60, it is determined whether a depression Bs of the brake pedal is greater than a threshold value TBs. As shown in FIG. 11B, the threshold value TBs is set to a value possible to determine whether the driver intends to stop the engine 1 immediately. If the depression Bs of the brake pedal is greater than the threshold value TBs so that the answer of step S60 is YES, the routine progresses to step S60 to select the low-power mode thereby reducing the torque and the speed of the engine 1 promptly.

By contrast, if the depression Be of the brake pedal is smaller than the threshold value TBs so that the answer of step S60 is NO, the routine progresses to step S60 to select the first control mode or the second control mode in accordance with the above-explained parameters such as the SOC level of the battery 6 and so on. Optionally, in addition to the threshold value TBs for selecting the low-power mode, another threshold value may also be set to select the second control mode.

Figure 12A:
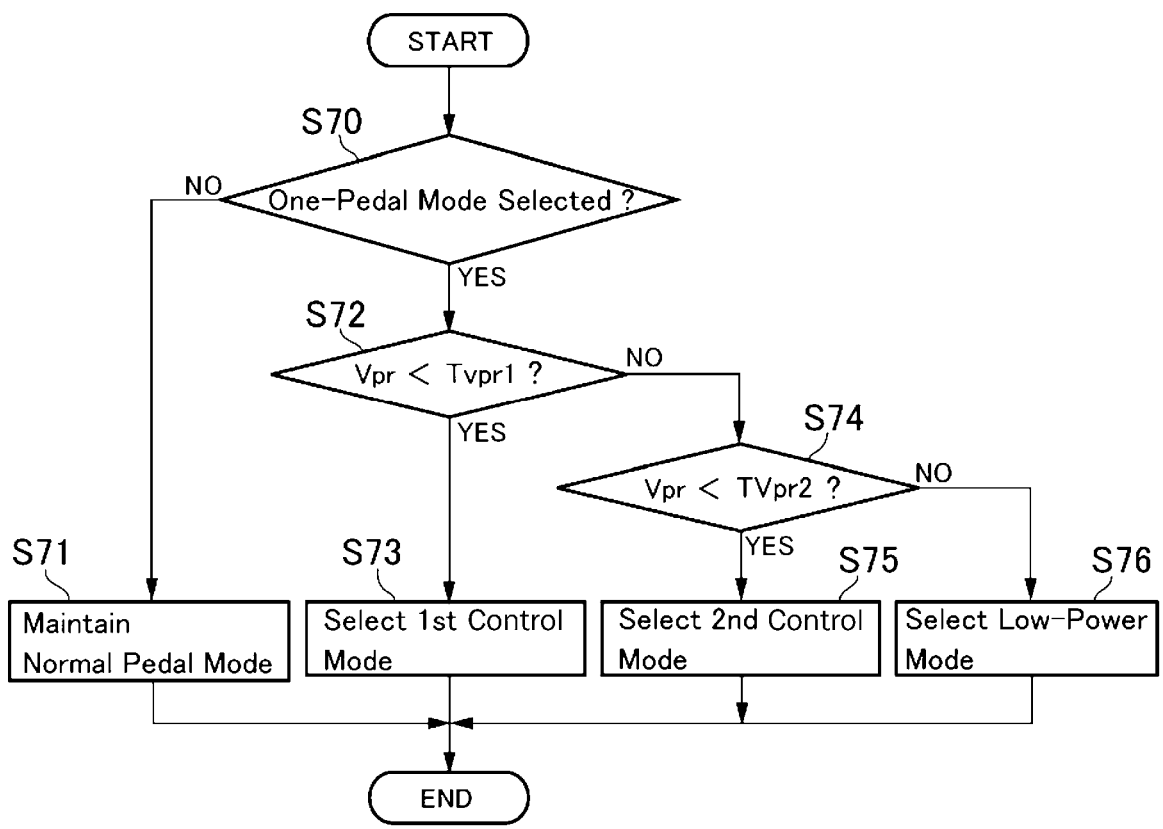
FIG. 12A is a flowchart showing a routine for selecting the control mode of the engine based on a releasing speed of a predetermined pedal in a one-pedal mode.
Figure 12B:
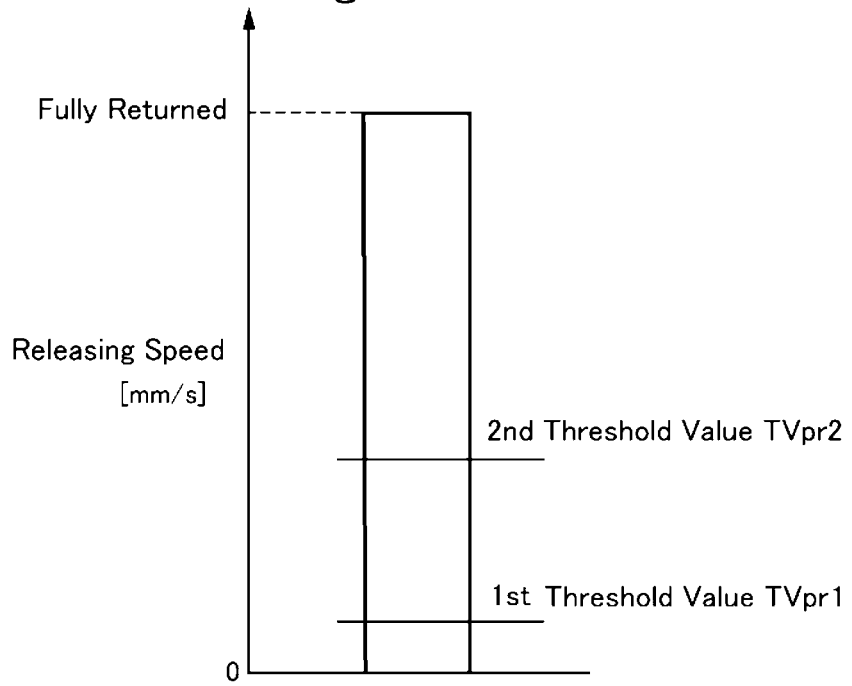
FIG. 12B is a graph showing threshold values of the releasing speed.

A one-pedal mode in which the vehicle Ve is accelerated and decelerated by manipulating a predetermined pedal may be available in the vehicle Ve to which the control system according to the exemplary embodiment is applied. FIGS. 12A and 12B show an example of the routine for selecting the control mode of the engine 1 based on a fact that the one-pedal mode is selected. In the one-pedal mode, a required deceleration or a jerk of deceleration is governed by a releasing speed Vpr of the pedal. Therefore, it is preferable to select the control mode of the engine 1 based on the releasing speed Vpr of the pedal. In the routine shown in FIG. 12A, at step S70, it is determined whether the one-pedal mode is selected. For example, such determination at step S70 may be made based on a fact that a switch for selecting the one-pedal mode is turned on. If the one-pedal mode is not selected so that the answer of step S70 is NO, the routine progresses to step S71 to maintain a normal pedal mode thereby accelerating and decelerating the vehicle Ve using the accelerator pedal and the brake pedal.

Otherwise, if the one-pedal mode is selected so that the answer of step S70 is NO, the routine progresses to step S72 to determine whether the releasing speed Vpr of the pedal is slower than a first threshold value TVpr1. As can be seen from FIG. 12B, the first threshold value TVpr1 is set to a relatively lower level. That is, if the releasing speed Vpr of the pedal is slower than the first threshold value TVpr1 so that the answer of step S72 is YES, a required deceleration is relatively small, and hence the engine 1 may be controlled in such a manner that the operating point is shifted along the optimum fuel economy curve. In this case, therefore, the routine progresses to step S73 to select the first control mode.

By contrast, if the releasing speed Vpr of the pedal is faster than the first threshold value TVpr1 so that the answer of step S72 is NO, the routine progresses to step S74 to determine whether the releasing speed Vpr of the pedal is slower than a second threshold value TVpr2. Specifically, the second threshold value TVpr2 is set to a higher level than the first threshold value TVpr1. That is, if the releasing speed Vpr of the pedal is faster than the first threshold value TVpr 1 but slower than the second threshold value TVpr2 so that the answer of step S74 is YES, a required deceleration is small enough to decelerate the vehicle Ve relatively slowly while reducing emission of the polluting gas. In this case, therefore, the routine progresses to step S75 to select the second control mode. By contrast, if the releasing speed Vpr of the pedal is faster than the second threshold value TVpr2 so that the answer of step S74 is NO, the routine progresses to step S76 to select the low-power mode thereby reducing the torque and the speed of the engine 1 promptly.

Figure 13A:
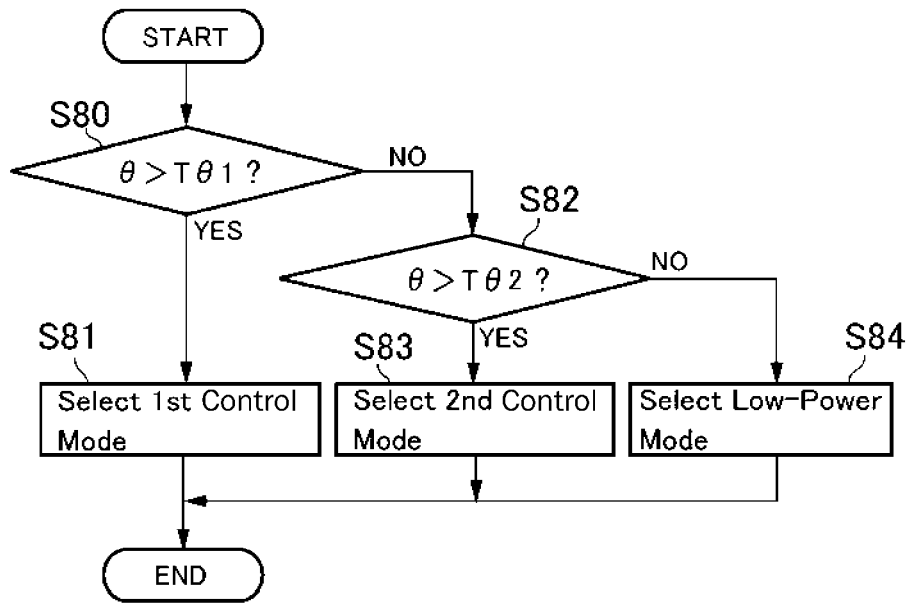
FIG. 13A is a flowchart showing a routine for selecting the control mode of the engine based on a road grade.
Figure 13B:
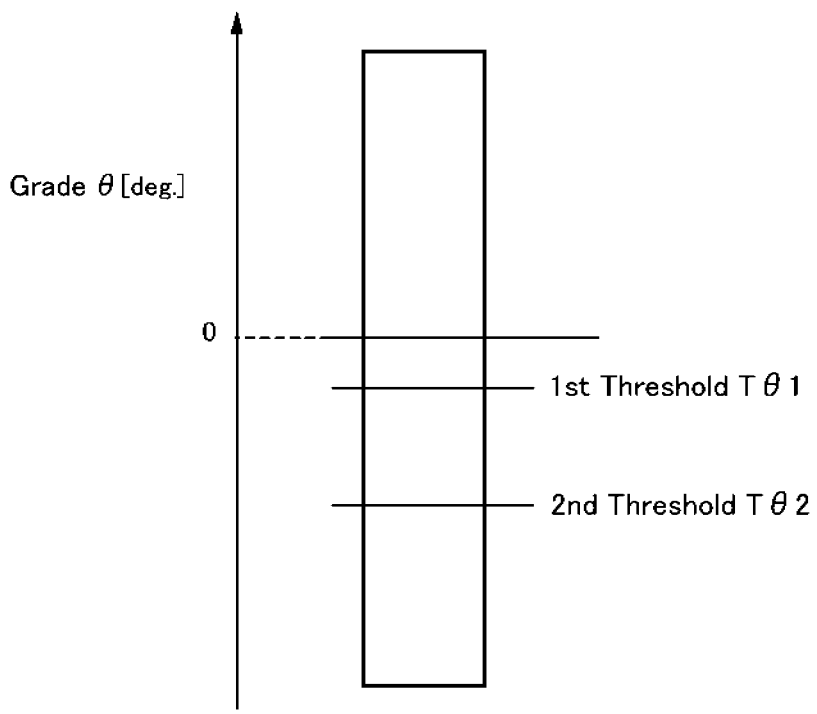
FIG. 13B is a graph showing threshold values of the road grade.

Turning to FIGS. 13A and 13B, there is shown an example of the routine for selecting the control mode of the engine 1 in accordance with a downhill grade θ with respect to a flat road. In the routine shown in FIG. 13A, at step S80, it is determined whether the downhill grade θ is greater than a first threshold grade Tθ1. As can be seen from FIG. 13B, since the first threshold grade Tθ1 is a threshold value of the downhill grade θ, the first threshold grade Tθ1 is set to a relatively greater negative value. If the downhill grade θ is greater than the first threshold grade Tθ1 so that the answer of step S80 is YES, the downgrade of the road is relatively mild, and hence the engine 1 may be controlled in such a manner that the operating point is shifted along the optimum fuel economy curve. In this case, therefore, the routine progresses to step S81 to select the first control mode.

By contrast, if the downhill grade θ is smaller than the first threshold grade Tθ1 so that the answer of step S80 is NO, the routine progresses to step S82 to determine whether the downhill grade θ is greater than a second threshold grade Tθ2. Specifically, the second threshold grade Tθ2 is set to a smaller value than the first threshold grade Tθ1. That is, if the downhill grade θ is smaller than the first threshold grade Tθ1 but greater than the second threshold grade Tθ2 so that the answer of step S82 is YES, an expected deceleration of the vehicle Ve is still small enough to decelerate the vehicle Ve relatively slowly while reducing emission of the polluting gas. In this case, therefore, the routine progresses to step S83 to select the second control mode. By contrast, if the downhill grade θ is smaller than the second threshold grade Tθ2 so that the answer of step S82 is NO, the routine progresses to step S84 to select the low-power mode thereby reducing the torque and the speed of the engine 1 promptly.

For example, the downhill grade θ may be expressed by a percentage (%) calculated based on a declination of the road in 100 m.

Thus, according to the exemplary embodiment, the vehicle Ve the control mode of the engine 1 may also be selected in accordance with the required deceleration. According to the exemplary embodiment, therefore, the engine 1 may be controlled in such a manner as to reduce emission of the polluting gas and to charge the battery 6 in the first control mode or the second control mode, while decelerating the vehicle Ve in accordance with the required deceleration.

Otherwise, if the torque and the speed of the engine 1 have to be reduced promptly, the low-power mode is selected to reduce the torque and the speed of the engine 1 promptly.

Figure 14:
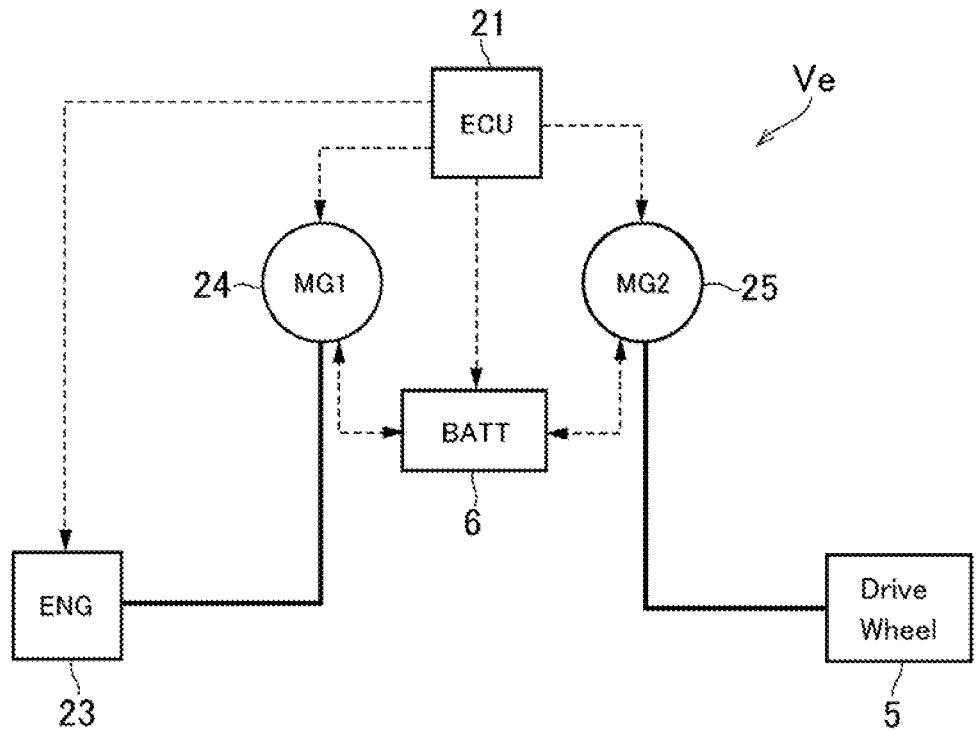
FIG. 14 is a schematic illustration showing another example of a structure of the hybrid vehicle to which the control system according to the exemplary embodiment if the present disclosure is applied.

Although the above exemplary embodiments of the present disclosure have been described, it will be understood by those skilled in the art that the present disclosure should not be limited to the described exemplary embodiments, and various changes and modifications can be made within the scope of the present disclosure. For example, the control system according to the exemplary embodiment may also be applied to a series-hybrid vehicle shown in FIG. 14. As illustrated in FIG. 14, a prime mover of the series-hybrid vehicle Ve includes an engine (referred to as ENG in FIG. 14) 23 as an internal combustion engine, a first motor (referred to as MG1 in FIG. 14) 24, and a second motor (referred to as MG2 in FIG. 14) 25. The series-hybrid vehicle Ve also comprises the drive wheels 5, the battery 6, and the ECU 21. The first motor 24 may be not only a generator but also a motor-generator, and the second motor 25 may be a motor-generator. In the series-hybrid vehicle Ve, the engine 23 is connected to the first motor 24 so that the first motor 24 may be driven as a generator to generate electricity. The second motor 25 is connected to the drive wheels 5, and the first motor 24 and the second motor 25 are electrically connected to each other through the battery 6. Therefore, the electricity generated by the first motor 24 may be supplied not only to the second motor 25 to operate the second motor 25 as a motor but also to the battery 6 to charge the battery 6.

Figure 15:
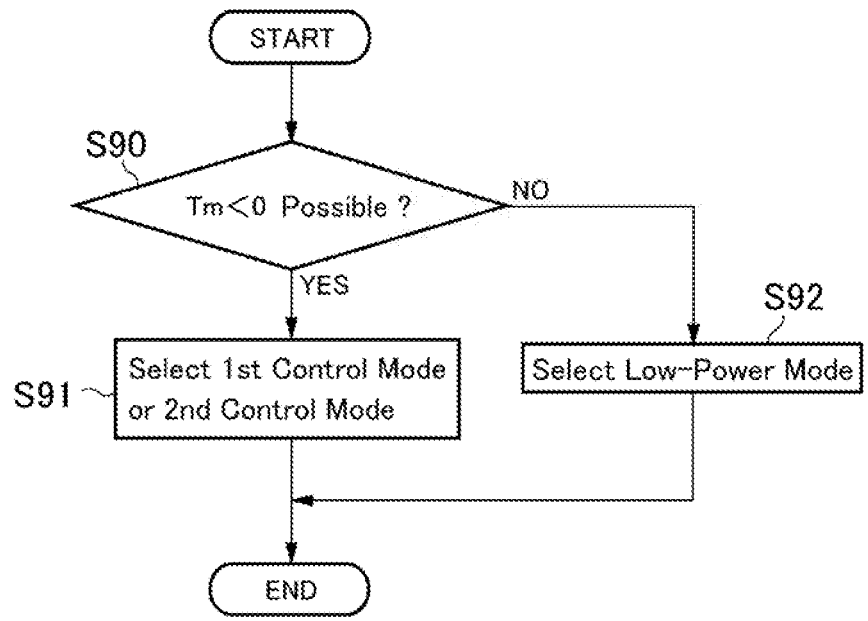
FIG. 15 is a flowchart showing a routine for selecting the control mode of the engine of the hybrid vehicle shown in FIG. 14 based on a possible output torque of the second motor.

FIG. 15 shows an example of the routine for selecting the control mode of the engine 23 of the series-hybrid vehicle Ve depending on the conditions of the first motor 24, the second motor 25, and the PCU. In the series-hybrid vehicle Ve, the engine torque Te delivered to the drive wheels 5 is zero, therefore, the series-hybrid vehicle Ve may be decelerated by generating a regenerative torque Tm smaller than zero by the second motor 25. Accordingly, at step S90, it is determined whether the second motor 25 will be allowed to generate the torque Tm smaller than zero given that the first control mode or the second control mode is selected. If the answer of step S90 is YES, the routine progresses to step S91 to select the first control mode or the second control mode in accordance with e.g., the SOC level of the battery 6. In this case, a torque and a speed of the engine 23 are reduced while regenerating electricity. By contrast, if the answer of step S90 is NO, the routine progresses to step S92 to select the low-power mode thereby reducing the torque and the speed of the engine 23 promptly.

Figure 16:
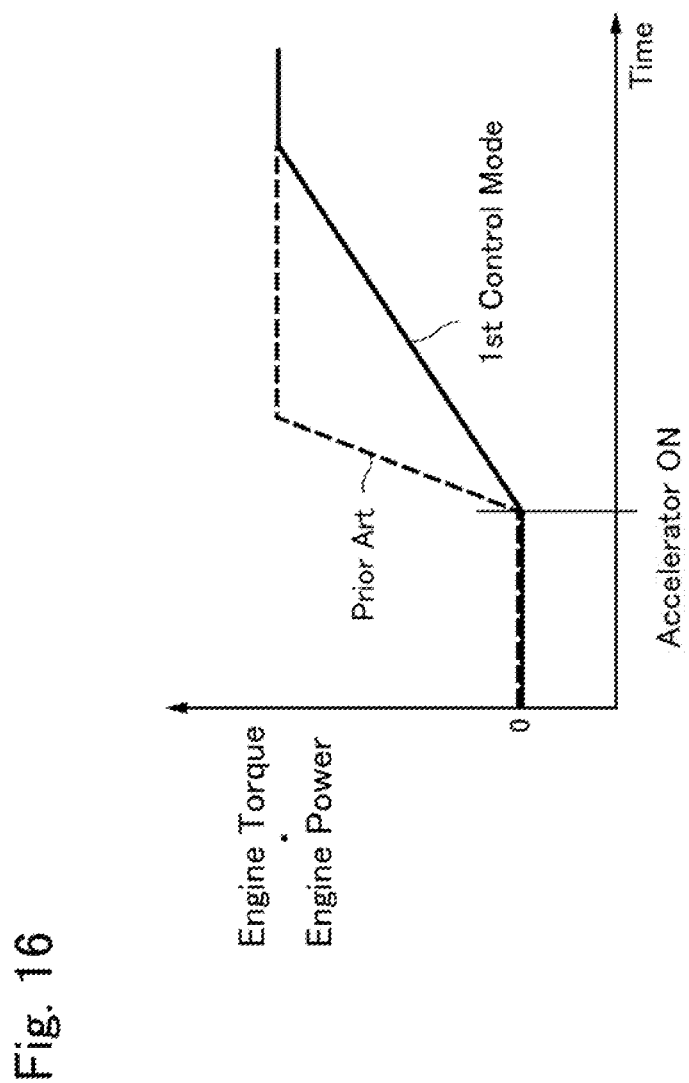
FIG. 16 is a graph indicating changes in the engine torque or the engine output in a case of controlling the engine in the first control mode when accelerating the hybrid vehicle.

Further, the first control mode may also be selected to control the engine 1 when accelerating the vehicle Ve. In a case of accelerating the vehicle Ve by the conventional way, the speed and the torque of the engine 1 are increased promptly in response to an operation of the accelerator pedal, as indicated by the dashed line shown in FIG. 16. By contrast, in a case of accelerating the vehicle Ve while controlling the engine 1 in the first control mode, the speed and the torque of the engine 1 are increased relatively slowly as indicated by the solid line shown in FIG. 16. In this case, shortage of the drive force resulting from reducing increasing rates of the speed and the torque of the engine 1 is compensated by operating the second motor 3 as a motor. Consequently, the vehicle Ve can be accelerated in an optimally fuel efficient manner while reducing emission of the polluting gas.

What is claimed is:

1. A control system for a hybrid vehicle comprising:
an engine;
a first motor that controls a speed of the engine;
a second motor that applies a brake torque to drive wheels when regenerating energy; and
an electric storage device that is electrically connected to the first motor and the second motor,
wherein the control system is configured to decelerate the hybrid vehicle by controlling the second motor to generate the brake torque while controlling the first motor to reduce a speed of the engine,
the control system comprises a controller that controls the engine,
the controller is configured to select a control mode of the engine from:
a low-power mode in which the hybrid vehicle is decelerated in response to a decelerating operation by reducing a torque and a power of the engine at a predetermined rate while generating the brake torque by the second motor; and
a high-power mode in which the hybrid vehicle is decelerated in response to the decelerating operation by reducing the torque and the power of the engine at a rate slower than the predetermined rate of the low-power mode while generating the brake torque by the second motor.

2. The control system as claimed in claim 1, wherein the high-power mode includes:
a first control mode in which the hybrid vehicle is decelerated while reducing the torque and the speed of the engine such that an operating point of the engine is shifted along an optimum fuel economy curve; and
a second control mode in which the hybrid vehicle is decelerated while reducing the torque of the engine at a same rate as in the first control mode, reducing the speed of the engine at a faster rate than in the first control mode, and reducing the power of the engine at a slower rate than in the low-power mode, so as to reduce emission.

3. The control system as claimed in claim 2, wherein the controller is further configured to select the control mode of the engine based on a state of charge level of the electric storage device or an acceptable value of an input power to the electric storage device when decelerating the vehicle.

4. The control system as claimed in claim 3, wherein the controller is further configured to
select the first control mode when the state of charge level of the electric storage device is lower than a first threshold level,
select the second control mode when the state of charge level of the electric storage device is higher than the first threshold level but lower than a second threshold level, and
select the low-power mode when the state of charge level of the electric storage device is higher than the second threshold level.

5. The control system as claimed in claim 3, wherein the controller is further configured to
select the first control mode when the acceptable value of the input power to the electric storage device is greater than a first acceptable value,
select the second control mode when the acceptable value of the input power to the electric storage device is smaller than the first acceptable value but greater than a second acceptable value, and
select the low-power mode when the acceptable value of the input power to the electric storage device is smaller than the second acceptable value.

6. The control system as claimed in claim 3, wherein the controller is further configured to
determine whether the input power to the electric storage device given that the engine is controlled in the first control mode is smaller than a current acceptable value of the input power to the electric storage device,
determine whether the input power to the electric storage device given that the engine is controlled in the second control mode is smaller than the current acceptable value of the input power to the electric storage device,
select the first control mode when the input power to the electric storage device given that the engine is controlled in the first control mode is smaller than the current acceptable value of the input power to the electric storage device,
select the second control mode when the input power to the electric storage device given that the engine is controlled in the first control mode is greater than the current acceptable value of the input power to the electric storage device, but smaller than the input power to the electric storage device given that the engine is controlled in the second control mode, and
select the low-power mode when the input power to the electric storage device given that the engine is controlled in the second control mode is greater than the current acceptable value of the input power to the electric storage device.

7. The control system as claimed in claim 3, wherein the controller is further configured to
select the control mode of the engine based on a required deceleration including a shift range, an operating amount of a brake pedal, an operating speed of a predetermined pedal in a one-pedal mode, and a road grade with respect to a flat road,
select the first control mode or the second control mode when a predetermined condition of the required deceleration is satisfied, and
select the low-power mode when the predetermined condition of the required deceleration is not satisfied.

8. The control system as claimed in claim 1, wherein the controller is further configured to determine whether the vehicle can be decelerated in the high-power mode in response to the decelerating operation using an equation of motion in which the torque of the second motor and the torque of the engine are employed as parameters.

9. The control system as claimed in claim 1, wherein
the hybrid vehicle further comprises a power split mechanism that distributes an output power of the engine to an output member and to the first motor,
the power split mechanism includes a planetary gear unit having an input element connected to the engine, a reaction element connected to the first motor, and an output element connected to the output member, and
the second motor is connected to a power transmission path between the drive wheels and the output member.

* * * * *